US007238222B2

(12) United States Patent
Peterson

(10) Patent No.: US 7,238,222 B2
(45) Date of Patent: Jul. 3, 2007

(54) THERMAL SYNTHESIS PRODUCTION OF STEEL

(76) Inventor: Oren V. Peterson, 1250 W. 2600 North, Pleasant Grove, UT (US) 84062

( * ) Notice: Subject to any disclaimer, the term of this patent is extended or adjusted under 35 U.S.C. 154(b) by 0 days.

(21) Appl. No.: 11/070,527

(22) Filed: Mar. 1, 2005

(65) Prior Publication Data

US 2006/0196311 A1 Sep. 7, 2006

(51) Int. Cl.
*C21B 15/00* (2006.01)
(52) U.S. Cl. ........................................ 75/500
(58) Field of Classification Search .............. 75/500, 75/501, 707, 503, 445, 452, 460, 477; 266/212, 266/217; 201/29, 24, 22
See application file for complete search history.

(56) References Cited

U.S. PATENT DOCUMENTS

| 1,532,300 | A | * | 4/1925 | Burgi ........................ 201/34 |
| 2,805,929 | A | * | 9/1957 | Udy ........................ 75/10.53 |
| 3,029,141 | A | * | 4/1962 | Sibakin et al. ................ 75/479 |
| 3,661,553 | A | | 5/1972 | Frans |
| 4,145,210 | A | | 3/1979 | Kato et al. |
| 4,239,530 | A | | 12/1980 | Goksel |
| 4,396,423 | A | | 8/1983 | Stephens, Jr. et al. |
| 4,419,128 | A | | 12/1983 | Nakagawa et al. |
| 4,434,003 | A | | 2/1984 | Geskin |
| 4,456,476 | A | | 6/1984 | Sherwood |
| 4,457,777 | A | | 7/1984 | MacGregor et al. |
| 4,542,114 | A | | 9/1985 | Hegarty |
| 4,940,488 | A | * | 7/1990 | Maeda et al. ................ 75/500 |
| 5,064,174 | A | | 11/1991 | Lehto et al. |
| 5,065,985 | A | | 11/1991 | Takahashi et al. |
| 5,069,716 | A | | 12/1991 | Dam et al. |
| 5,076,838 | A | | 12/1991 | Rierson |
| 5,100,314 | A | | 3/1992 | Rierson |

(Continued)

FOREIGN PATENT DOCUMENTS

JP 62-227020 * 10/1987

OTHER PUBLICATIONS

Encyclopedia of Chemical Technology, Fourth Edition, Kirk-Othmer, vol. 6, p. 504, 1993, John Wiley & Sons inc.*
Metals Handbook, Desk Edition, 2nd Edition, 1998, ASM International, p. 1186.*

*Primary Examiner*—Roy King
*Assistant Examiner*—Kathleen McNelis
(74) *Attorney, Agent, or Firm*—Clayton, Howarth & Cannon, P.C.

(57) ABSTRACT

A process for producing liquid steel is disclosed. Carbon monoxide and oxygen may be combusted in a high temperature reactor. Iron and iron oxide materials, along with scrap steel if desired, may be placed in the high temperature reactor. Carbon dioxide produced in the high temperature reactor may be circulated through a back reactor vessel. Coke masses may be placed in the back reactor vessel. The coke may be formed by circulating heated carbon monoxide counter current to crushed coal in a rotary kiln. The carbon dioxide circulated through the back reactor vessel reacts with the coke to form carbon monoxide. The carbon monoxide may be conveyed to the high temperature reactor to be combusted with oxygen to produce the heat for forming the liquid steel.

69 Claims, 2 Drawing Sheets

U.S. PATENT DOCUMENTS

| | | |
|---|---|---|
| 5,139,568 A | 8/1992 | Geiger |
| 5,246,482 A | 9/1993 | Murakami et al. |
| 5,454,853 A | 10/1995 | Edelson |
| 5,496,392 A * | 3/1996 | Sims et al. .................. 75/414 |
| 5,733,358 A | 3/1998 | Geiger et al. |
| 5,885,325 A | 3/1999 | Geiger et al. |
| 6,402,808 B1 * | 6/2002 | Dry ............................ 75/500 |
| 2004/0226406 A1 * | 11/2004 | Duarte-Escareno et al. ... 75/452 |

* cited by examiner

THERMAL SYNTHESIS PRODUCTION OF STEEL

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Invention

The present disclosure relates generally to a method for producing steel, and more particularly, but not necessarily entirely, to a method for producing liquid steel from iron ore which may or may not be supplemented with scrap steel.

2. Description of Related Art

In the conventional steel making processes, iron ore is reduced to a metallic state by carbon monoxide and fusion reduction in a highly carbonized environment. This occurs in both blast furnace and Corex processes (defined below). A blast furnace is a towering cylinder lined with heat-resistant (refractory) bricks used by integrated steel mills to smelt iron from its ore. Its name comes from the "blast" of hot air and gases forced up through the iron ore, coke and limestone that load the furnace. Under extreme heat, chemical reactions among the ingredients release the liquid iron from the ore. The blast of air burns the coke, and limestone reacts with the impurities in the ore to form a molten slag. The hot metal collects in the bottom of the furnace. Once fired up, the blast furnace operates continuously.

The Corex process is a coal-based smelting process that yields hot metal or pig iron. The process gasifies non-coking coal in a smelting reactor, which also produces liquid iron. The gasified coal is fed into a shaft furnace where it removes oxygen from iron ore lumps, pellets or sinter. The reduced iron is then fed to the smelting reactor.

The environment in the blast furnace and the Corex processes produces an iron with carbon levels in the liquid iron far above the desired level for quality crude liquid steel. This results in conditioning the liquid iron such that it is susceptible of harboring other impurities. Both these methods require other unit operations to remove these impurities and excessive carbon. Expensive processes, such as the Bessemer Convertor, Open Hearth Furnace and the Electric Furnace have been developed in which expensive equipment and operations, including the basic oxygen processes, are used for the purpose of removing these undesirable impurities to acceptable levels. These operations are expensive, consume great quantities of energy, and have limitations as to the amount of the various impurities they can economically remove and the quality and types of steel each can produce.

Because of the production processes and the nature of the carbonaceous iron produced in the blast furnace and Corex processes, virtually all the phosphorous constituents that enter the furnace are reduced, and readily combine chemically with the ferrous metal which is drawn off in solution with the liquid metal as an impurity. Phosphorous is very detrimental to the metallurgical properties of steel, which with present customary methods is difficult and expensive to remove, and results in losses of metals that must be oxidized into the slag bath to aid in the removal of this highly detrimental impurity. The removal of phosphorous results in the loss of metallic iron. Because of the excessive carbonaceous environment in the combustion zones of both of these processes, only primary combustion occurs. Primary combustion may be referred to as the combustion of carbon and oxygen to form carbon monoxide. Primary combustion may utilize only a mere 28% of the potential energy available from the complete oxidation of carbon. When the secondary phase of the oxidation of carbon is completed, the calorific energy released elevates temperatures and fusion reduction, which absorbs high levels of energy and proceeds more rapidly with higher temperatures when controlled portions of carbon and oxygen are being fed into the process.

The present process may release all the potential energy that can be released from the oxidation of carbon. Furthermore the process can reclaim a larger portion of the energy released if it is not utilized in the fusion and reduction process. Various volumes of carbon dioxide or carbon monoxide may serve as oxygen carrying vehicles to remove oxygen from the process. Carbon monoxide may be used as an export gas or it may be utilized for the production of hydrogen gas.

The process of the present disclosure may utilize virtually all the secondary combustion (the combustion of carbon monoxide and oxygen to form carbon dioxide) of carbon in the fusion reduction process and may be extremely more fuel efficient and less capital extensive than methods now in use. Also, the process may be very flexible in the quantities of scrap steel that can be utilized. This may be beneficial due to the variations in the availability of scrap and the quality of steel desired. The present process may readily reduce high phosphorous fine low cost ores to crude liquid steel. It may also lower considerably the cost of maintenance, and require far less fuel and man hours to produce a given quantity of steel. Moreover because the levels of impurities can be readily lowered and removed, in some instances becoming by-products, the present process may be more cost efficient and the products more desirable. The present process can produce a quality of crude liquid steel of high purity ready for alloying, casting or further processing.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
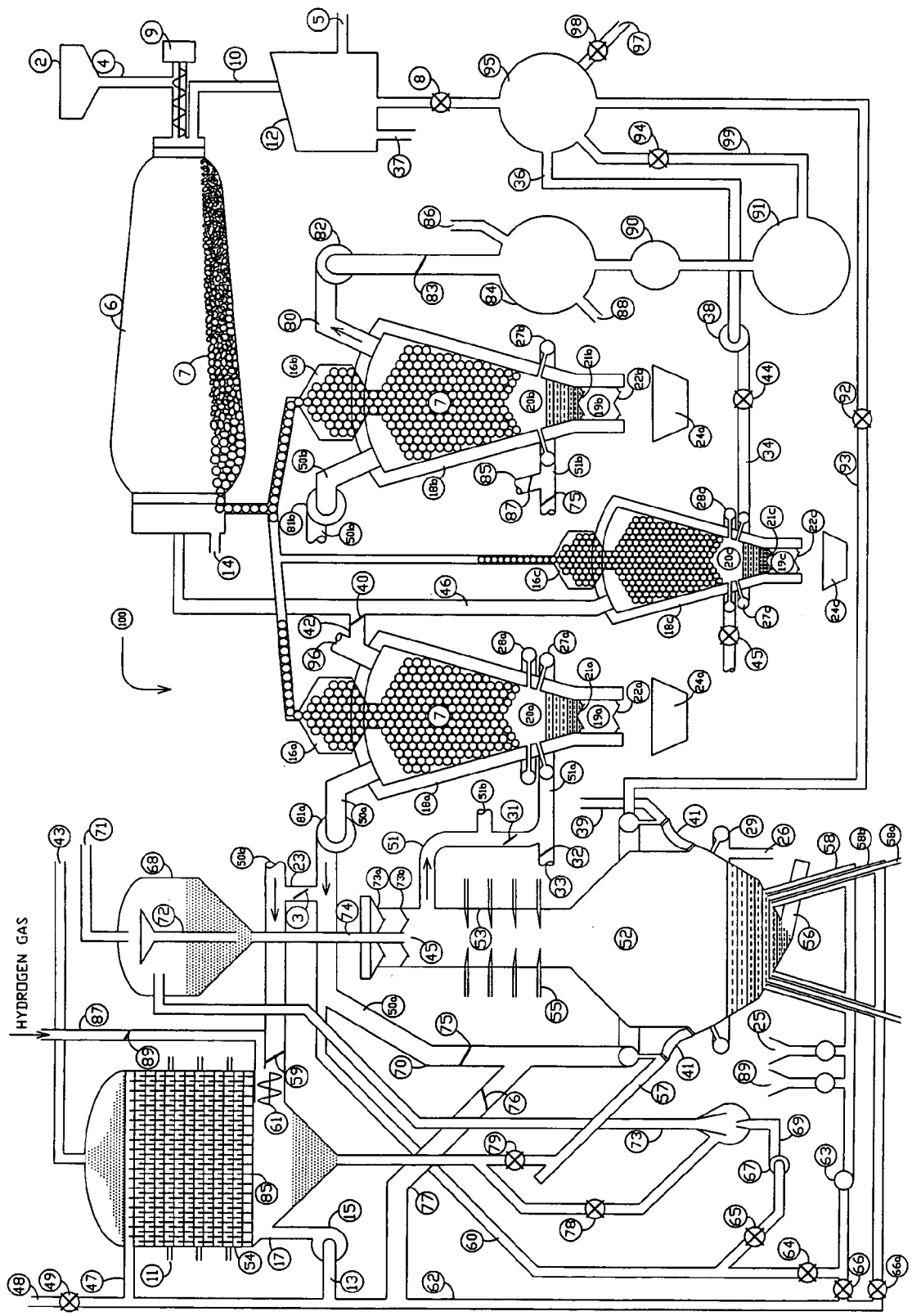
FIG. 1 is a schematic view of a steel production process in accordance with the principles of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the invention claimed.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the term "coke" shall refer broadly to a fuel used for making steel, which may be formed as a solid residue of impure carbon, obtained from bituminous coal and other carbonaceous materials after removal of volatile material by destructive distillation.

As used herein, the term "conduit" shall refer broadly to a mechanism for carrying a substance from one point to another, including, but not limited to pipes, channels, tubes, passages, and ducts, for example.

The phrase "primary combustion" as used herein shall refer to the combustion of carbon and oxygen to form carbon monoxide. The phrase "secondary combustion" as used herein refers to the combustion of carbon monoxide and oxygen to form carbon dioxide.

Referring now to FIG. 1, a schematic view is shown of a steel production process, indicated generally at 100, in accordance with the principles of the present disclosure. A carbonaceous material, such as coal, may be loaded into a hopper 2. The coal may be crushed to a particles size of approximately 25 millimeters (mm) in cross sectional area, for example, or other suitable size know to those skilled in the art. The coal may then be transferred through a coal conduit 4, and/or through a conveyance device 9 such as an auger or conveyor for example.

The coal may be transferred into the upper end of a rotary kiln 6. The rotary kiln 6 may be of any variety known in the art such as a rotating drum retort, but may alternatively comprise any suitable retort such as a static mixer retort, a gravity flow retort, a fluid bed retort, a screw conveyor retort, or some other type of retort useable in accordance with the principles of the disclosure to form coke from the crushed coal.

Carbon monoxide may be generated and/or heated to temperatures ranging from approximately 1,000 to 1,800 degrees Fahrenheit (F.) in a gas generating and heating device 18c. It will be understood that the gas generating and heating device 18c may be formed in any manner known to those skilled in the art. Moreover, the carbon monoxide may be supplied from any source, including carbon monoxide that may be generated as part of the present process 100 or within the gas generating and heating device 18c, as described more fully below. The carbon monoxide may be forced to flow counter current to the crushed coal in the rotary kiln 6. The carbon monoxide may be chemically inert to reacting with the coke though it may convey a great portion of the energy released from the gas generating and heating device 18c. As the carbon monoxide flows counter to the coal it may have direct contact with the coal and may have a high degree of heat transfer through convection heating. This may excite physical and chemical reactions within the coal which may result quickly in the destructive distillation of the coal to form coke. As the coal particles tumble in the rotary kiln 6, they may adhere together forming nuclei which grow into coke balls or masses 7. The coke masses 7 may continually enlarge as they gravitate, and roll, towards the lower end of the rotary kiln 6. The particles in the coke masses 7 may be securely bonded together as the hydrocarbons from the coal decompose, cementing the particles with charred carbon residue as the coke masses 7 roll along in the rotary kiln 6.

As the volatile substances produced from the coal are swept away by the oncoming hot carbon monoxide gas entering the lower end of the rotary kiln 6, the carbon monoxide may progressively heat the tough coke masses 7 insomuch that the volatile agents are nearly all removed before the coke masses 7 are ejected at the lower end of the rotary kiln 6. These hot volatile gases, including sulphur, may be removed from the upper end of the kiln 6 and conveyed through a by-products conduit 10. It will be appreciated that the yellow sulphur element may be randomly distributed in small pockets in coal, but after the coal is crushed, the sulphur may be dispersed throughout the coal.

Sulphur may produce a heavy dense gas when it is vaporized in conventional coking ovens. A large portion of the sulphur gas may lie with the hot coke in the coke ovens and later condense in the coke when the coke has been removed and is quenched with water, such as at a quenching tower. In the present steel production process 100, the vaporized sulphur and other volatile gases may be physically removed from the coke masses 7 by the forced draft of the carbon monoxide. The sulphur may be transferred to the by-products area 12 with the other discharged gases. The sulphur may be removed from the other volatile gases when the gases are cooled and the sulphur condenses. It will be appreciated that sulphur may melt at approximately 112.8 degrees Celsius (C.), or 235.4 degrees F., and sulphur may vaporize at approximately 444.6 degrees C., or 832.2 degrees F.

The coke masses 7 may be removed from the rotary kiln 6 through a coke conduit 14 en route to a cooling facility (not shown) before being exposed to the air. For example, the cooling facility may utilize steam, and may generate carbon monoxide and hydrogen gas with the sensible energy. The coke masses 7 may be processed and used for multiple purposes including chemical coke. Alternatively, the coke masses 7 may be transferred directly to coke reservoir cylinders 16a, 16b, and 16c, which may be used to supply back reactor vessels (BRVs) 18a, 18b, and also gas generating and heating device 18c. It will be appreciated that any number of coke reservoir cylinders 16a, 16b, back reactor vessels 18a, 18b, and other related structures, may be used within the scope of the present disclosure. As shown in FIG. 1, two back reactor vessels 18a, 18b may be included. It will be appreciated that the back reactor vessels 18a and 18b may be similar in shape, and that the gas generating and heating device 18c may also be similar in shape compared to vessels 18a and 18b. However, it is to be understood that gas generating and heating device 18c has a distinct function that is different than 18a and 18b. Similarly, other duplicate structures in the present disclosure may be referred to with the same reference numeral having different letters (16a, 16b for example).

In the back reactor vessel 18, the coke masses 7 may be dissolved or consumed by the chemical back reaction of high temperature carbon dioxide with the carbon ($CO_2$+ C ------>2CO−40,800 cal/mol). This reaction may occur at temperatures above approximately 600 degrees C. or 1100 degrees F. The equilibrium of carbon dioxide to carbon monoxide is completed through conversion of carbon dioxide and coke to carbon monoxide, as temperatures reach 1800 degrees F. and above. The carbon dioxide may be produced in a high temperature reactor 52 from the combustion of carbon monoxide with oxygen in the smelting process discussed more fully below. The sensible heat energy from the high temperature reactor 52 may be reclaimed and converted to a desirable fuel, as described in the above reaction and discussed in greater detail below. This reaction may convert the sensible heat to chemical energy above 600 degrees C. or 1,100 degrees F. The super hot carbon dioxide from the high temperature reactor 52, along with coke, may back react in the back reactor vessel 18 generating the carbon monoxide fuel which is the main energy source that drives this process. It may be appreciated that excess volumes of carbon monoxide may be generated in back reactor 18a, by adding carbon dioxide and oxygen into this vessel as discussed below.

As the coke masses 7 react, they may diminish in size until they may be completely consumed. Any remaining ashes may melt and drop down into a lower chamber 20 of the back reactor vessel 18. The remnants of the coke masses 7 may be collected in the lower chamber 20 along with any dust, molten ash and minute particulates, including iron, that may have been absorbed. The lower chamber 20 may have a conical shaped bottom forming an area where material may be collected and expelled from the back reactor vessel 18. The material in the lower chamber 20 may pass through a gas lock 21 into a chamber 19. The chamber 19 may be located immediately below the gas lock 21. The material may also pass through a second gas lock 22 prior to being expelled from the lower chamber 20. It will be appreciated that different numbers of gas locks may be used, or other devices known in the art may be used to allow the material to be withdrawn from the back reactor vessel 18 without allowing gases to escape the back reactor vessel 18, within the scope of the present disclosure. The material may then fall into a skip 24 or container known in the art for removal of the material for further processing.

The heat carrying medium, carbon monoxide, used for the destructive distillation of the coal may be generated and heated to the required temperature in the gas generating and heating device 18c. Carbon monoxide, along with toxic waste and dioxins that may be desired to be removed from the by-products of the process 100, may be blown into the gas generating and heating device 18c through tuyers connecting circle pipe 27c into 18c via conduit 34, blower 38 and volume control valve 44. Oxygen may also be placed in the gas generating and heating device 18c through control valve 45 and circle pipe 28c. Oxygen control valve 45 may be used to control the temperature of the gas leaving gas generating and heating device 18c, by controlling the volume of oxygen that can react with the fuel, gases or coke mass, which releases energy. The toxins and dioxin may be incinerated in the gas generating and heating device 18c, or they may be utilized in the primary reduction vessel 54 as cooling agents. The coke mass may be introduced into 18c via storage vessel 16c by a by-products blower 38. Oxygen may also be placed in the gas generating and heating device 18c through an oxygen conduit 40. An oxygen control valve 42 may be used to control the temperature of the injection gas leaving the combustion chamber of the gas heating device 34 by controlling the volume of oxygen that can react with the fuel and release heat energy. The toxics and dioxins may be incinerated in the gas heating device 34 along with some amounts of the volatile gases produced in the rotary kiln 6, and coke breeze, or fine coke particles, which may be introduced into the gas heating device 34 through a coke hopper 16c. Combustion in the gas generating and heating device 18c may release considerable quantities of heat. The flow or volume and temperature of the super heated carbon monoxide entering the rotary kiln 6 may be determined by hot gas control valve 44, which may control the reactants entering the combustion chamber of the gas generating and heating device 18c to combust in an excessive carbonaceous environment. The super heated gases produced in the gas generating and heating device 18c may be conveyed to the rotary kiln 6 through a hot gas conduit 46. It will be appreciated that the super heated gas may enter the lower end of the rotary kiln 6 and the coal may enter the rotary kiln 6 at the opposite, upper end. As the super heated gases flow counter current to the coal, the super heated carbon monoxide may transfer a large portion of its thermal energy to the coal. Accordingly, increasingly larger masses of coke may form while the coke moves along its path towards the lower end of the rotary kiln 6 where the coke masses 7 may be discharged. The coking cycle may be completed as the volatile gases may be discharged at the upper end of the rotary kiln 6, and the coke masses 7 may be discharged at the opposite end.

Ore may be comminuted in preparation for use in the process 100. The ore may then be sized into desired grades, such as two grades of particle sizes ranging from approximately 12 mm to 2 mm, and approximately 2 mm to 0 mm, for example. The smaller size particles of the ore may be partially reduced in a primary reduction vessel (PRV) 54, whereas the larger sized particles may be placed directly into the high temperature reactor (HTR) 52 for fusion reduction.

In operation of the high temperature reactor 52, a port or tap hole 56 in the reactor 52 may be plugged to form an enclosure. A moderate to light flow of carbon monoxide and oxygen may be injected into the reactor 52 through one or more tuyers 58. A "tuyer" as referred to herein may be described broadly as an opening or passage for injecting a material into a chamber. It will be understood that one embodiment of the tuyer 58 may include concentric passages, such as an inner passage 58a and 58b. Different materials may be injected through the inner passages 58a and 58b as compared to the remainder of the tuyer 58. For example, oxygen may be injected through inner passage 58a, and carbon dioxide may be injected through passage 58b, such that the carbon dioxide forms a buffer zone in vessel 52 between the oxygen and the carbon monoxide as they are injected into the molten bath, whereas carbon monoxide may be injected through the remainder of the tuyer 58. It will be appreciated that tuyers of various different configurations may be used, and that various different materials may be injected through the tuyers 58. The carbon monoxide and oxygen may continuously flow into the reactor 52 where it may be combusted. Gas may flow into the reactor 52 directly from the back reactor vessel 18a through a first reactor supply conduit 60 or indirectly through the primary reduction vessel 54 flowing through a second reactor supply conduit 62. A gas mixer 61 may be provided to mix gases in the area of the primary reduction vessel 54. It will be understood, however, that the location of the gas mixer 61 may vary, and that some embodiments of the present disclosure may not utilize a gas mixer. The off gas flowing from the primary reduction vessel 54 through the second reactor supply conduit 62 may be heavy laden with carbon dioxide while the gas flowing through first reactor supply conduit 60 may include a high concentration of carbon monoxide. Either gas may be chosen or a mixture or selection as required through reactor control valves 64, 66.

As the process commences a moderate flow of gas may be maintained through the tuyers 58 to prevent materials from entering the tuyers 58 and causing blockage of the tuyers 58. The reactor control valves 64, 66 may be used to control the flow of gas through the tuyers 58 to increase the flow of gas in preventing blockage during the initial charging process and also to minimize the release of energy until sufficient material is in place to absorb the released energy. The reactor control valves 64, 66 may also provide means to prevent excessive heat from leaving the back reactor vessel 18 due to excessive heat generated from the combustion of carbon monoxide producing high temperature carbon dioxide laden gases, the absorption of energy from carbon dioxide back reacting with the coke in vessel 18a.

Until some melt down occurs in the high temperature reactor 52, fusion reduction, which produces carbon dioxide and absorbs energy, will not take place in high temperature reactor 52. Amounts of carbon dioxide through reactor control valve 66 and gas flow control 76 in addition to the carbon dioxide produced from combustion, may sustain gas flow and a reliable thermal balance in the lower and the upper regions of the high temperature reactor 52 and the high temperature shaft (HTS) 53, and prevent the off gas from back reactor vessel (BRV) 18 over heating, due to the lack of sufficient volumes of carbon dioxide in the super heated off gas to absorb the thermal energy.

In order to increase the thermal level in the high temperature reactor 52, additional flows of oxygen and gas may be required. If this resulting fusion energy is not sufficiently utilized, sensible heat absorption in the bath, or fusion and heat loss and excessive temperature, may result in the off gas from high temperature shaft 53. This can be compensated for by reducing the oxygen flow, which would reduce the thermal energy released and carbon dioxide production. However, in the alternative, oxygen volumes may be increased to sustain sufficient desired volumes of carbon monoxide production, accompanied by sufficient volumes of carbon dioxide to provide a thermal balance in back reactor vessel 18a to subdue temperatures near 1800 F., which should be maintained as a standard temperature range in one embodiment of the present disclosure. Variable portions of this gas may be used as a utility gas, although priority volumes may be consumed for combustion and reduction in vessel 52, and for reduction in vessel 54.

Reduction of iron oxide with carbon monoxide is exothermic. Moreover, there is a substantial different temperature range between the so-called sticky point of the ore and the carbon monoxide leaving the back reactor vessel 18b. However, the heat produced in the vessel 54 due to the reduction reactions may create temperatures in which the sticky point of the ore may be reached. To compensate for this increase in temperatures, several methods of reducing the temperatures may be employed. For example, in one embodiment of the present invention, the gas which conveyed the phosphorous from the slag bath in vessel 52, exiting through-vessel 18b, was scrubbed, cooled and stored in vessel 95. Along with this gas, the heat-conveying gas leaving rotary kiln 6, and the residual gases remaining after the by-products have been removed, are conveyed into vessel 95. These gases may be conveyed from storage vessel 95 and introduced through conduit 87 into vessel 54. These gases would serve as a physical and chemical means of cooling the gas conveyed through conduit 50b into vessel 54. Also, temperature reduction may be accomplished in that hydrogen and/or methane gases may be conveyed into and enter conduit 87, to be mixed with carbon monoxide in mixer 61. Furthermore, blower 15 may be employed to circulate the gas exiting vessel 54 through conduits 47, 62, 15, and 17, completing a circuit back to entering vessel 54 admixing with all of the gases that percolate up through the fluidized metallic beds. This flow of gas could be used to normalize the temperature throughout vessel 54, and also facilitate the downward flow rate of the solid materials in the fluidized beds of vessel 54. Additionally, minute amounts of coke breeze may be added with hydrogen and or methane gases, which may be injected through multiple conduits 11 at hot spots that may occur.

Through proper application, these methods will result in reactions that maintain temperatures in vessel 54 below that which may cause the ore to be in the so-called sticky phase. Carbon dioxide generated in vessel 54 may be conveyed into circle pipe 27b via vessel 18b, causing an equilibrium adjustment to maintain a lower temperature. Regardless of whether that conveyance is utilized, the gas exiting vessel 54 through conduit 48 is of high concentration in carbon dioxide at relatively low temperature. By recirculating this gas via circle pipe 27b into back reactor 18b, the equilibrium of the reaction $CO2+C \longleftrightarrow CO-40\ 800$ cal would adjust such that this reaction should proceed to the right and at a lower temperature, thus producing more carbon monoxide and absorbing heat. In this manner, back reactor 18b may operate as a low temperature back reactor, serving primary reduction vessel 54 with low temperature low concentration of carbon monoxide, while back reactor 18a may function at a high temperature, producing a gas of high concentration high temperature carbon monoxide and serving high temperature vessel 52. Vessel 18c may function as a gas generating and heating device serving rotary kiln 6 for the production of coke. All three vessels 18a, 18b and 18c have separate and distinct functions and all three consume masses of coke.

In charging the high temperature reactor 52, first a layer of granulated coke or a mixture of coke and ore may be evenly distributed over the bottom of the high temperature reactor 52. It will be appreciated that the high temperature reactor 52 may form a crucible. The high temperature reactor 52 may also have a refractory layer, lining, or portion comprised of a heat resistant material. The layer of granulated coke or mixture of coke and ore may form a chemical heat absorbing blanket between the refractory layer and the high temperature metallic bath produced in the high temperature reactor 52.

Next a large charge of partially reduced iron ore from a separation and storage vessel 68 may be placed in the crucible, filling the crucible to near capacity. Fuel gas flow may be circuited through a reactor control valve 64 which may carry the gas directly from the back reactor vessel 18a. This gas may maintain a delivery temperature of approximately 1800 degrees F., and may burn with oxygen producing a high intensity heat reaching temperatures ranging up to 4,000 degrees F. or higher, for example, in the bath. This heat may be readily absorbed by the metallic oxide bath in the high temperature reactor 52, as the gas is blown up through the metallic oxide bath, it is in direct contact with molten bath. Carbon dioxide may be nearly inert in reacting with iron or its oxides but may be highly reactive with a carbonaceous metallic bath. This is one reason it may be beneficial to maintain a dominantly oxidizing metallic bath. The high intensity of heat of combustion of the carbon monoxide with oxygen may be readily absorbed by the metallic bath. Total calorific production may be high with the elimination of the products of combustion from back reacting with the carbon in the metal bath in high temperature reactor 52. The metal and metal oxide, as it increases in temperature, may increase the thermal energy in the high temperature reactor 52. Moreover, the metal and metal oxide may be readily mixed by the combustion gases and may robustly react with coke injected through coke injection tuyer 41, or tuyer 58 absorbing significant quantities of heat in fusion and fusion reduction reactions. These reactions may keep the refractory lining in the high temperature reactor 52 cool and further mix the bath of molten material in the high temperature reactor 52.

As the reactions in the high temperature reactor 52 intensify, additional metal and metal oxides may be simultaneously added to the metal bath through a riser conduit 72. The metal and metal oxides may be carried to the riser conduit 72 through a metal oxides conduit 71. The metal and metal oxides may then free fall through a materials feed tubing 74 and pass through dispersing fins 45 as the ore enters the high temperature shaft 53 above the high temperature reactor 52. The ore may be heated as it free falls counter current to the super hot rising draft of carbon monoxide and carbon dioxide before it reaches the high temperature reactor 52 and has sufficient thermal energy to sustain the fusion reduction reaction with coke and carbon monoxide. Also all the reduction reaction with the iron oxides and carbon monoxide are exothermic. Both of these reactions may occur simultaneously along with the combustion of carbon monoxide and oxygen in the high temperature reactor 52.

Although fusion reduction is mentioned several times in describing this process, the major portion of the reduction which may be accomplished in the operation may be by the means of the carbon monoxide. Fusion reduction with carbon that may occur in the present process may be from the coke employed to remove phosphorous and the cooling of the periphery to keep the refractory liner in the high temperature reactor 52 from overheating. Also, when the metal bath in the high temperature reactor 52 overheats, coke may be injected to lower the temperature of the bath.

A brief description of the combustion, regeneration, and waste removal cycle of the present process will now be discussed. When carbon monoxide is oxidized with oxygen, carbon dioxide is produced and great quantities of energy are released. This secondary combustion commences in the high temperature reactor 52, and can be represented stoichiometrically as follows: $2CO+O_2 \rightarrow 2CO_2+135,200$ cal/mole. The regeneration phase of the cycle may begin slightly at the periphery above the slag bath in the high temperature reactor 52 and may be completed as the gas percolates up through coke 7 in the back reactor vessel 18a, represented stoichiometrically as follows: $CO_2+C \longrightarrow 2CO-40,800$ Cal/mole of oxygen combusted. Regeneration will go to completion only when the sensible heat in the off gas exceeds the thermal requirements of the above reaction. Additional sensible heat may be conveyed from the high temperature reactor 52 by increasing the flow of carbon monoxide through carbon monoxide conduit 70 and coke injector tuyer 41 along with additional carbon monoxide and oxygen through tuyer 58 or circle pipe 29. As long as there is excessive carbon dioxide in the back reactor vessel 18a, regeneration may remove the excessive heat by the above reaction.

It may be desirable to produce an off gas in the high temperature reactor 52 that produces a low concentration of carbon dioxide in the off gas from the back reactor vessel 18a. This may be accomplished by maintaining a temperature in the back reactor vessel 18a near the thermal energy level 1800 degrees F. The temperature may be increased by increasing the oxygen flow through circle pipe 28a, 29 or 58, depending where it may be desirable to increase the temperature.

As the reduction of the iron oxide with carbon monoxide proceeds in the primary reduction vessel 54, a considerable amount of heat may be produced. To prevent the primary reduction vessel 54 from over heating, chemical cooling reagents may be injected into the primary reduction vessel 54 at various stages. These chemical cooling reagents may cool as the iron oxide is reduced, or as the carbon dioxide is back reacted. For example, hydrogen absorbs energy as it reduces iron oxides. Also, carbon absorbs energy as it back reacts with carbon dioxide. Natural gas also absorbs energy as it decomposes. As natural gas decomposes, it absorbs heat, and hydrogen is also released which reduces the iron oxide and absorbs energy. Furthermore, as natural gas decomposes, carbon is released which back reacts with carbon dioxide, absorbing energy. It may be desirable to have all of these or similar cooling reagents available as cooling options even though they may not all be required at any given time. In one embodiment of the present disclosure, the ores in the primary reduction vessel 54 must be kept well below the sticky temperature, or the temperature at which the ore may have adhesive properties. Accordingly, the ore may be maintained in fluidized beds 85 throughout a height of the primary reduction vessel 54. Conduits 11 may be used to inject hydrogen or methane in hot spots in the primary reduction vessel 54. It will be understood that sensors, such as thermocouples or any other suitable device for detecting temperatures, may be used in the primary reduction vessel 54 to detect hot spots. Accordingly, a particular conduit 11 may be selected for injecting hydrogen or methane gas to cool a particular hot spot.

Reaction that may occur in this process include the following:
A. Reductions with CO which are all Exothermic:
 (I) $Fe_2O_3+CO \rightarrow 2FeO+CO_2+38,260$ calories;
 (ii) $Fe_3O_4+CO \rightarrow 3FeO+CO_2+15,600$ calories;
 (iii) $FeO+CO \rightarrow Fe+CO_2+2,340$ calories.
B. Reductions with Reagents Causing Endothermic Reactions:
 (iv) $Fe_3O_4+2C \rightarrow 3Fe+2CO_2-44,540$ calories;
 (v) $4FeO+2CH_4 \rightarrow 4Fe+2CO_2+4H_2-61,986$ calories;
 (vi) $2FeO+2C \rightarrow 2Fe+2CO-34,200$;
 (vii) $CO_2+C \rightarrow 2CO-40,800$ calories;
 (viii) $FeO+H_2 \rightarrow Fe+H_2O-7,874$ calories.

Carbon dioxide may serve as an oxygen carrying vehicle in removing oxygen from the reduction and combustion in this process. The carbon dioxide may be removed through carbon dioxide conduit 48 or it may be used to produce carbon monoxide in the back reactor vessel 18a as an export gas. In this case the carbon monoxide may serve as the oxygen carrying vehicle in the removal of oxygen from the process. Various quantities of carbon monoxide gas may be generated as desired by manipulating the flow of the oxygen through conduits 58 or 28 and 29 and also by the utilization or the discharge of the carbon dioxide. The generation phase of carbon monoxide from carbon dioxide and carbon will reach a state of equilibrium as the excess heat is removed. If greater amounts of carbon monoxide are desired from the generation phase, greater volumes of oxygen and carbon dioxide may be added to the combustion phase in the high temperature reactor 52 through conduits 29 and 70 or through conduits 27a and 28 in the back reactor vessel 18a, thus increasing the thermal level and allowing a larger portion of the carbon dioxide to back react with the carbon in the back reactor vessel 18a, 1.31 volumes of carbon dioxide are converted to carbon monoxide and 4.62 volums of carbon monoxide are generated per volume of oxygen consumed.

The gas leaving the combustion and regeneration phase, in the back reactor vessel 18a via conduit 96, and from back reactor vessel 18b, may travel via effluent conduit 80 and 83 through separator and an effluent blower 82 to a waste removal phase of the process 100. Similarly, it will be understood that the gas leaving the combustion and regeneration phase in the back reactor vessel 18a may travel via effluent conduit 96 to a storage tank or the like for use as a utility gas, or for use in the generation of another gas, such as hydrogen gas, or for any other desired use known to those skilled in the art. The waste removal phase may begin with the removal of the waste heat in a waste heat boiler 84. It will be understood that the waste heat boiler 84 may be formed of a variety of boilers known in the art, such as vessels having a plurality of tubes carrying water. The heat in the gas in the effluent conduit 80 may be transferred to the water in the tubes thereby generating steam and cooling the gas so that condensation of waste, such as phosphorous, in the gas may occur. The waste heat boiler 84 may need to generate steam below 600 psi, 40 atm., (it will be appreciated that phosphorous boils at 380 degrees C. or 536 degrees F.) to assure the condensation of the phosphorous. The phosphorous may then be collected and removed via a phosphorous conduit 88 and the steam may be carried through a steam conduit 86. The cooled gas exiting the waste heat boiler 84 may then be further cooled in a cooler 90. The cooler 90 may be formed in any manner known in the art for cooling gases. Also, the gases may be cleaned in a scrubber 91. The scrubber 91 may be formed of any variety of scrubbers known in the art for removing unwanted constituents from the gas, such as sulfur dioxide. The cleaned carbon monoxide gas may then be carried through a conduit 99 and control valve 94 to a storage vessel 95. The carbon monoxide in the storage vessel 95 may be used within the present process 100, or it may be exported for use in other processes.

It will be understood that gas leaving the combustion and regeneration phase, in the back reactor vessels 18a, 18b may travel via conduits 50a, 50b, respectively, for use in the primary reduction vessel 54 and/or the high temperature reactor 52. It will be understood that in one embodiment of the present disclosure, the conduits 50a, 50b may be used as a flow path for carbon monoxide and not a temperature outlet/control.

The operation of the processes in the rotary kiln 6 and the primary reduction vessel 54 may be continuous, whereas the operation of the process in the high temperature reactor 52 and the high temperature shaft 53 may proceed in batches or semi-continuous. The operation in the back reactor vessel 18 may follow the operation of the high temperature reactor 52 and the high temperature shaft 53, or the operation in the back reactor vessel 18 may be continuous. The reducing gas required to operate the primary reduction vessel 54 may be obtained by manipulating the operation in the high temperature reactor 52 to reheat stored carbon monoxide from the storage vessel 95 and carbon dioxide produced in the primary reduction vessel 54 and conveyed via gas conduit 77 and coke injector tuyer 41. These gases may be admixed and heated to generate more reduction gas in the back reactor vessel 18 for the operation of reduction in the primary reduction vessel 54. Thus a continuous variable flow of utility gas may be produced and the primary reduction vessel 54 may continue its operation while the taping and recharging operation of high temperature reactor 52 is in progress.

In commencing to produce a new heat or batch of steel, particles of coke may be distributed over the bottom surface inside the high temperature reactor 52. The particles of coke may be applied to provide a heat barrier to the high temperature reactor 52, and to chemically absorb the heat from the liquified ore and the ferrous particles as the material in the high temperature reactor 52 is reduced. It will be appreciated that the ferrous particles may also sometimes be referred to as "sponge" ferrous particles due to a high quantity of pores that may be present in the ferrous particles, as such particles may never have been melted. Fusion reduction may occur, thereby shielding the vessel from the intense heat and lowering the temperature of the metallic bath in the high temperature reactor 52. However this reduction may progressively accelerate because of the heat energy released from the internal combustion in the metallic bath with carbon monoxide and-oxygen, in accordance with the stoichiometric equation: $CO+O_2 \longrightarrow CO_2 + 135,200$ cal/mol. This reaction may rapidly heat the bath of material in the high temperature reactor 52 and release high quantities of energy to maintain swift reduction in the high temperature reactor 52. However, it will be appreciated that the refractory layer in the high temperature reactor 52 may be cooled due to the endothermic reaction from the fusion reduction of the iron oxide with the coke adjacent to the refractory layer.

After the particles of coke are placed in the high temperature reactor 52, particles of reduced iron and iron oxide may be placed in the high temperature reactor 52 from the storage vessel 68 through the material feed tubing 74. The particles of reduced iron and iron oxide may descend downward to baffles dispersing the particles into the high temperature shaft 53. The particles may descend counter current to the combustion gases ascending from the bottom and originating in the high temperature reactor 52. Combustion may be implemented by the injection of carbon monoxide and oxygen through one or more of the tuyers 58, which may be located in the bottom or the bottom portion of the side wall of the high temperature reactor 52. The one or more tuyers 58 may be constructed with a larger cylindrical conduit having helical baffles on the inner periphery of the conduit that connect to the crucible of the high temperature reactor 52. The baffles in the tuyers 58 may direct the materials to flow in a vortex, projecting the dense solid materials outward as they enter the crucible and into the molten liquids in the high temperature reactor 52. This may cause the injected gases to separate from the solids. There may also be an inner passage or coaxial conduit 58a, as discussed above, in the tuyers 58 which may be used to inject oxygen from the center of the tuyer 58. The combustion of carbon monoxide with oxygen may burn to form carbon dioxide which may burn, thereby releasing more heat per unit volume of flue gas, approximately seven and one quarter times more intense than coke burning with a forced air draft to form carbon monoxide (the combustion in the bottom of a blast furnace). Moreover, the heat may be two and one half times more intense than carbon burning with oxygen to form carbon monoxide, (the combustion in the Corex process). See the tables presented below for examples of heat production. It will be understood that this combustion would rapidly melt any fine materials descending down the high temperature shaft 53 and rapidly drive the heat absorbing fusion reduction reaction in the high temperature reactor 52 to completion. To moderate the temperatures in the high temperature reactor 52, varying excessive gas flows for combustion may be conveyed through the back reactor vessel 18a and injected in the high temperature reactor 52 through tuyer 58 along with proper volumes of oxygen, requiring only the portion of the carbon monoxide to be oxidized in accordance with the energy requirements for the operation. This excess of carbon monoxide may create a barrier between the oxygen and the molten bath and it may also serve as a reduction reagent for the metal oxides in the bath. However, if the heat in the high temperature reactor 52 is too intense, greater volumes of gas may be circulated through the high temperature reactor 52 and the high temperature shaft 53 from the back reactor vessel 18. This gas may flow through the first reactor supply conduit 60, the second reactor supply conduit 62, the carbon monoxide conduit 70 or gas conduit 77, depending on where it is desired to lower the heat intensity. Lowering the oxygen flow through the tuyer 58 may lower the heat intensity of the whole operation commencing in the metal bath in the high temperature reactor 52. As this process proceeds particles of hematite ore along with the sponge iron particles, (desirably sized approximately 2 mm or less, for example), may be conveyed from the storage vessel 68 to the material feed tubing 74 where the particles may descend into the high temperature shaft 53 and on down to the high temperature reactor 52. The metallic iron and the iron oxide may quickly form a molten metallic bath. The metallic materials and coke should be loaded into the crucible of the high temperature reactor 52 as quickly as possible to protect the refractory lining of the crucible from the intense heating. As these materials are loaded in the high temperature reactor 52 through the material feed tubing 74, a mound of material may begin to build around the tuyer 58. Coke, or a mixture of coke and partially reduced iron oxide or iron oxide, may be added through an input conduit 57 around the periphery in the vessel through the coke injection tuyer 41 that may be formed as a circle of multidirectional injection tubes. The iron particles and ore may fill the high temperature reactor 52 after a layer of coke, or a mixture of coke and iron oxide, have first been injected onto the refractory lining. Thus, an envelope of coke may be created around the iron particles and ore concentrate. The combustion gases of carbon monoxide and oxygen, burning from soft to moderately, may blow up through the material until the high temperature reactor 52 may be filled to the proper capacity.

It will also be understood that the circle pipe or conduit 29 may be provided for adding oxygen to the high temperature reactor 52 in a location above molten material in the high temperature reactor 52. Accordingly, the temperature of the high temperature reactor 52, above the bath, may be raised without placing additional oxygen directly in the molten bath. The addition of oxygen in the high temperature reactor 52 may increase the temperature and allow more carbon monoxide to be generated in the back reactor vessels 18. It will be understood that the position and configuration of the conduit 29 may vary within the scope of the present disclosure, and that the conduit 29 may not be utilized in some embodiments.

As the combustion in the high temperature reactor 52 is of high intensity and the rate of combustion may be restrained or highly liberated, the melt down of the material in the high temperature reactor 52 may also be moderated or rapid. It may be desirable to maintain a predominantly metallic oxidizing molten bath until the melt down and reduction process of the heat is near completion. This may be desired for several reasons. For example:

(A) Carbon monoxide burns with a high intensity forming carbon dioxide. If the carbon dioxide comes in contact with a carbonaceous environment the carbon dioxide back reacts with the carbon, absorbing large amounts of energy, and thereby cancelling a larger potion of the high intensity of the combustion of the carbon monoxide. This contact should be deferred until the carbon dioxide reaches the back reactor vessel 18. However, there may be minimal contact as the carbon has reduced the phosphorous pentoxide in the slag bath to elemental phosphorous in the high temperature reactor 52. This should be deferred until the major portion of the reduction is completed. The metal oxide level maintained in the metal bath may oxidize any ferrous phosphate to phosphorous pentoxide and drive the phosphorous pentoxide to the surface of the slag bath where it may be reduced with a thin layer of coke and removed as elemental phosphorous vapor. In other words, in some embodiments, it may not be desirable to have carbon dioxide reacting with carbon to produce carbon monoxide in the high temperature reactor 52, even though a small amount of this reaction may take place in the high temperature reactor 52. This may be achieved by placing only a small and appropriate amount of coke on the surface of the slag bath, without placing excessive amounts of coke on the slag bath.

(B) Fusion reduction is moderately to highly endothermic, and the rate of melt down and feeding of the raw materials can be constant if energy levels are maintained by combustion of carbon monoxide and oxygen. Excessive energy levels may be removed rapidly by fusion reduction of the oxides, which removal may lower the sensible heat from the metallic bath in the high temperature reactor 52. This may happen purposely or unintentionally by adding coke on the slag bath, however, reduction rates progressively increase with fusion reduction at higher energy levels.

(C) The intense heat from the combustion in the heart of the charged material may melt the oxides more quickly. This heat may be generated in a position which allows the heat to readily dissipate to the encompassing reactants of the metallic bath. The oxides melt at a lower temperature than the metal, thus absorbing the heat more quickly and protecting the encircling refractory liner from the buffeting heat as the process absorbs the necessary energy required for fusion reduction.

(D) The required high energy level of the bath, for metal oxides, serving as oxygen carrying agents can more readily be achieved, and the removal of several impurities in the refining process, namely sulphur and phosphorous, can be completed sooner in a highly intensely heated oxidizing metallic bath environment.

(E) This may be a prerequisite to determining the final carbon oxygen balance of the metallic reduction in the high temperature reactor 52 although they may continue simultaneously.

(F) The oxidizing bath may also prohibit the reduction of silicon and other more active metals. If the silicon and other more active metals were reduced, they would dissolve in the metal bath, otherwise their oxides continue becoming a part of the slag bath.

(G) The sulphur and its compounds may be oxidized as sulphur dioxide and may be removed with the top gas. The phosphorous as phosphorous pentoxide may rise from the metallic bath to the molten slag bath. Here it may be in position to receive the carbon through coke injection tuyer 41 and be reduced and removed as an elemental vapor when the fusion reduction phase begins as coke is fed onto the surface of the slag and is transferred to the metal bath as the liquid rolls and internal combustion of the gases injected into the metal through the tuyer 58. At this point fusion reduction may become very robust as the rate of reduction increases rapidly with increasing temperature.

The slag bath shall be maintained acidic during the melt down and until the reduction of iron oxide is finalized or near completion. This may be helpful to assure the phosphorous pentoxide in the slag is prevented from forming the salt (calcium phosphate), thus preventing the phosphorous pentoxide from being reduced and removed as elemental phosphorous. The reduction of phosphorous pentoxide may occur simultaneously with the fusion reduction of the iron oxide, as the coke is fed onto the surface of the slag via input conduit 57. The phosphorous pentoxide may then be reduced to an elemental vapor. The reduction of phosphorous in the slag bath and the iron in the metal bath may proceed rapidly as coke is fed and dissolved into both of these intensely heated baths. Fusion reduction may proceed rapidly and may boil vigorously as the bath absorbs the coke and the coke reduces the oxides. The elemental phosphorous may be removed from the high temperature shaft 53 as a vapor with the flue gas and may continue down stream in the process via low temperature back reactor 18$b$ until it may be condensed and may be collected as the removal of the waste heat from the gas in the waste heat boiler 84. It will be appreciated that phosphorous condenses at 516 degrees F. or 280 degrees C. Thus, the gas must be cooled below this temperature to facilitate the removal from the process. The removal of phosphorous will commence only after the reduction of iron oxide is very near the final stage of reduction. All the flue gas leaving vessel 52 and 53 must exit through low temperature back reactor 18$b$ as phosphorous is removed at this stage, as the reduction appears to have reached completion, while burnt dolomite or calcium oxide may be injected onto the slag bath creating a predominately basic bath. The basic bath may combine with the silicon oxide, and any residue of phosphorous pentoxide which may remain, consummating a thorough phosphorous removal.

After completing the charging of the particles of sponge iron, coke and iron oxide into the high temperature reactor 52, the melt down and the fusion reduction may commence, as previously described. If scrap steel is desired in the heat of steel, fingers 55 may be extended into the high temperature shaft 53. The fingers 55 may be water cooled for example, or the fingers 55 may be cooled by other cooling mechanisms known in the art. The fingers 55 may be loaded by passing materials through gas locks 73$a$, 73$b$, until the proper tonnage is attained. It will be appreciated that the gas locks 73$a$, 73$b$ may be bell valve gas locks or any other variety of devices known in the art for allowing material to be placed into the high temperature shaft 53 while preventing gases from escaping the high temperature shaft 53. For example, gas lock 73$b$ may remain closed while gas lock 73$a$ is opened to receive the scrap steel. Then gas lock 73$a$ may be closed and gas lock 73$b$ may be opened such that the scrap steel may enter the high temperature shaft 53 while gases are prevented from exiting the high temperature shaft 53 through the gas lock 73$a$. This scrap steel may be preheated and even melted with the combustion gas or flue gas from the high temperature reactor 52 during fusion reduction. The scrap steel may be dropped into the bath just prior to or at the beginning of the deoxidation period (the deoxidation process follows immediately after the reduction process) oxygen may be added through circle pipe 29 to increase the heat level in the high temperature shaft 53 to melt the scrap steel. It will be understood that each heat or batch of steel may be produced with or without the addition of scrap steel. If scrap steel is not desired, ferrous oxides may be further added through the input conduit 57 or the material feed tubing 74 as the reduction progresses.

The rate of fusion reduction may increase rapidly as the temperature increases. It will be appreciated that the heat of formation of carbon monoxide may be approximately 26,800 cal/mole, and the energy released as carbon monoxide further oxidizes to form carbon dioxide, may be an additional 67,600 cal/mole. The later exceeding the first by slightly more than two and one half. The extraordinary thermal efficiency of this process may depend largely upon a few basic principles as follows:

(A) Employing the secondary combustion of carbon, $2CO+O_2 \longrightarrow 2CO_2+135,200$ cal/mole, and eliminating primary combustion as we know it, $C+O_2 \longrightarrow 2CO+53,600$ cal/mole, almost altogether in vessels 52, 53, and 54. However, this is the major heating reaction in vessel 18$c$. To accomplish this, the coke may be metered and fed onto the slag bath in amounts only slightly in excess of that which is necessary to accommodate the reduction of the phosphorous pentoxide and the fusion reduction of the iron oxides. The combustion of carbon monoxide with oxygen ejected from tuyer 58, may furnish the energy requirements for the reduction reaction and for the melt down of all the constituents of the bath in accordance with the equation $2CO+O_2 \longrightarrow CO_2+135,200$ cal/mole. The top gases may be carbon dioxide with amounts of moderating carbon monoxide, and may be injected in the high temperature reactor 52 through the injection tuyer 41. The top gas may also be conveyed to the high temperature back reactor vessel 18$a$, there converting the sensible heat of the top gas with carbon to carbon monoxide and eliminating primary combustion of carbon with oxygen as discussed above, and the top gas may then be injected in high temperature reactor 52 through injection tuyer 41.

(B) When dealing with processes requiring high temperatures, high intensity of heat, having a higher range or degree of the heat can be utilized with more efficiency before the temperatures decrease below a useful range, the driving force of the elevated heating medium. When the heated medium requires an elevated temperature, if the heating medium will only reach temperatures slightly above what is a minimum required temperature, only a small portion of the sensible heat, maybe 10% of the thermal energy, can be driven into or utilized by the heated medium. Whereas if the heating medium could be elevated an extra 30% with a higher intensity of heat, the efficiency would be increased four fold for the same volume of flue gas. There would be a greater range of thermal energy which could be extracted from the heating medium by the heated medium. Rather than using high volumes of lower intensity of energy consuming large amounts of chemical energy and only moderately elevating the sensible heat in the heated medium which yields low efficiency in high temperature processes. Secondary combustion, $2CO+O_2 \longrightarrow 2CO_2+135,200$ cal/mole, precedes primary oxidation. Among other things the following back reaction, $C+CO_2 \rightarrow 2CO-40,800$ cal/mole, recovers the otherwise waist heat from the flue gas. The reaction uses carbon dioxide as the oxidant and principally replaces the primary combustion of carbon with oxygen. This process recovers a large portion of the sensible heat from the off gases, rather than using oxygen to initially oxidize the carbon, as described by the equation $2C+O_2 \longrightarrow 2CO+53,600$ cal/mole. Using oxygen to oxidize carbon is a much less intense energy source that releases only moderate amounts of energy. In the present process, energy is recovered from the flue gas in accordance with the equation $40,800$ cal/mole$+C+CO_2 \longrightarrow 2CO$. Accordingly, the use of primary combustion with oxygen generating carbon monoxide is almost completely eliminated. The combustion of carbon monoxide, $2CO+O_2 \longrightarrow 2CO_2+135,200$ cal/mole, has a much higher caloric production than primary combustion, $2C+O_2 \longrightarrow 2CO+53,600$ cal/mole. Both reactions may use the same quantities of oxygen. The secondary combustion delivers slightly more than two and one half times as much heat per volume of oxygen consumption as the primary combustion. Moreover, secondary combustion can employ a chemical means of recovering a large portion of the sensible heat (60%) which can be recycled, whereas primary combustion cannot.

(C) The secondary combustion, if not completed, may be recycled. Recycling through the tuyer 41 may be desirable to lower the intensity of the heat in the high temperature reactor 52 and the high temperature shaft 53 to acceptable temperatures for thermally protecting the refractory lining of the high temperature reactor 52 from over heating. Recycling of the combustion may also convey a sufficient amount of sensible energy from the high temperature reactor 52 to completely implement the back reaction of all the carbon dioxide conducted through the reactor effluent conduit 51. The gases injected through tuyer 41 may be directed, creating a whirling action, such that the cooler denser gas may remain adjacent to the refractory wall. This may also convey sensible energy from the combustion zone, the high temperature reactor 52, to the regeneration zone, the back reactor vessel 18, where carbon, carbon dioxide and thermal energy may be converted to carbon monoxide (thermal synthesis).

(D) A high degree of the heat energy, which is not utilized in the high temperature reactor 52, may be recovered and converted into chemical energy through thermal synthesis or back reacting. Carbon dioxide and carbon may recover the sensible heat and generate more carbon monoxide which can be utilized as high intensity combustion. This process may commence in the high temperature reactor 52, at the periphery of the slag bath as the off gas from the primary reduction vessel 54 is conveyed through the gas conduit 77 and is injected into the high temperature reactor 52. This gas may have been through the back reactor vessel 18a which may cool the reducing gas down to the range of approximately 1800 degrees F. The gas may have also percolated up through the fine ores in primary reduction vessel 54. This gas may now be laden with carbon dioxide. Also, as shown in FIG. 1, gas conveyed through conduit 70 may have been through back reactor vessel 18a which may cool the reducing gas down to the range of approximately 1800 degrees F. The gas flowing from either conduits 77 or 70 may have a primary function to provide a cool gas barrier between the high temperature combustion gas and the refractory lining in the high temperature reactor 52. This gas may encircle the high temperature combustion gas which may have a temperature range of between approximately 3000–4000 degrees F. or greater and may be cooled to acceptable temperatures for the refractory lining in the high temperature reactor 52. The gas may be further cooled by the discharge gas from separator and storage vessel 68 conveyed through the riser conduit 72, and the materials feed tubing 74 into the upper region of high temperature shaft 53. The gas may now be conveyed through the reactor effluent conduit 51 to the lower chamber 20 of the back reactor vessel 18. This gas may now percolate up through the coke masses 7 resulting in hot carbon dioxide gas and carbon being converted to carbon monoxide gas, in accordance with the following equation: $40,800$ cal/mol$+CO_2+C \longrightarrow 2CO$. The principle facility for the process of converting the carbon dioxide gas to carbon monoxide gas may be the back reactor vessel 18.

As the fusion reduction of the iron ore nears completion in the high temperature reactor 52 the phosphorous pentoxide reduction commences and is shortly completed and removed as a vapor. At this time the coke input may be terminated on the surface of the slag, and a fluxing materials may be added to the surface through a flux conduit 39. Terminating the coke flow onto the slag surface, before finalizing the fusion reduction and before adding fluxing material onto the slag surface, may prevent the other metal compounds from being reduced and dissolving in the metallic bath. The fluxing material may be burnt dolomite for example, or any other suitable fluxing material known to those skilled in the art. The dolomite may neutralize the acidity of the slag bath, giving it fluidity and also removing any residue of phosphorous pentoxide which may remain in the slag bath, and which may not have been reduced to elemental phosphorous and removed as a vapor, thus forming calcium phosphate. The molten metallic bath may now be allowed to increase to its maximum allowable temperature from the combustion. The metal bath, by the enhanced heating from carbon monoxide and oxygen, may reach flame temperatures of above 3500 degrees F. These temperatures are sufficient for carbon deoxidizing which may be extremely effective at high temperatures. Controlled minute measures of powdered coke may be conveyed through the tuyer 58. This powdered coke may be injected with the carbon monoxide directly into the molten metal bath. This may be another measure to prevent the more active metal compounds in the slag bath from being reduced with the carbon. The injection of metered powder coke through meter 89 may also be employed for the final fusion reduction and deoxidation of the metallic bath in the high temperature reactor 52. The deoxidation of FeO with carbon at high temperatures may progressively go to near completion, as the product of the reaction is removed as a gas, as the oxides of carbon, leaving no residue of aluminum oxide and silicon oxide to create inclusions in the finished metal product. The high temperature furnishes the energy to drive the reaction which may absorb considerable energy and the process may move forward rapidly as the products of the reaction are removed and the reaction can only proceed in one direction.

If the carbon content of the metallic bath becomes greater than is desired in the heat of steel a combustible gas may be conveyed through the second reactor supply conduit 62 to tuyer 58. This gas may be laden with carbon dioxide and may back react or oxidize with the carbon, forming carbon monoxide and reducing the carbon content of the metal bath. Carbon dioxide is inert to reacting to metallic iron. Minute amounts of FeO may also be injected through iron oxide meter 25 into the high temperature vessel 52 along with the gas from the second reactor supply conduit 62 through the tuyer 58, enhancing decarbonization.

The tuyer 58 may blow gases upward through the molten baths in the high temperature reactor 52, thoroughly mixing the ingredients so that the molten baths become very uniform. Alloying ingredients may be added to the high temperature reactor 52 after the deoxidation and decarbonizing is completed, or the molten bath may be tapped and the alloying ingredient may be added in a ladle during tapping. Alternatively, the ingredients may be added in an electrical metallurgical furnace (not shown), or in other methods known in the art. The liquids, slag and steel may be separated after leaving the high temperature reactor 52 through tap hole 56. The liquid slag may be skimmed from the molten steel en route to separate ladles.

The present process may provide various features, including the following:

(1) Sufficient energy may be released to liquify the solids in the process, while also raising the temperature adequately so as to aid in the smelting, separation and processing of the materials.

(2) More than the equivalent energy of the heat of formation of the various compound necessary to be decomposed may be furnished so that the various detrimental elements may be removed.

(3) A vehicle or reagent(s) may be provided to remove undesirable elements by both chemical and physical means.

Carbon and carbon monoxide, may both release considerable quantities of energy as they are oxidized. Carbon as it is partly oxidized with oxygen, $2C+O_2->2CO+53,600$ cal/mole, releases moderate amounts of heat energy. As carbon is completely oxidized, $C+O_2->CO_2+94,400$ cal/mole, a more intense heat is released. And carbon monoxide as it is further oxidized with oxygen, $2CO+O_2->2CO_2+135,200$ cal/mole releases considerably more amounts of heat. Each of these reactions requires one mole of oxygen. Carbon and carbon monoxide both aid in filling all three of the above referenced features. Carbon and carbon monoxide may remove oxygen from the oxygen bearing compounds and covey the oxygen from the process. Carbon monoxide, as it is further oxidized to carbon dioxide with oxygen, may liberate more energy per unit volume of oxygen reduced than any hydrocarbon fuel, without exception. Carbon monoxide is an excellent utility fuel and it can also be utilized in the production of hydrogen with a catalytic converter. There is an option of removing the oxygen from the process as carbon dioxide or as carbon monoxide. If more carbon monoxide is desired, the present process may require the production of more coke and oxygen than to remove oxygen by carbon dioxide from the process. This may be accomplished by adding a proper balance of carbon dioxide and carbon monoxide through tuyers 58 or 41, and by adding oxygen through tuyers 58a and/or circle pipes 28a and 29. In other words, if it is desired to increase the temperature of the bath, a blend of gases may be introduced through the tuyer 58. If it is desired to increase the temperature in high temperature shaft 53, a blend of gases may be introduced through tuyer 41 and oxygen through circle pipe 29. Moreover, if it is desired to not increase the temperature in vessel 53, carbon dioxide may be introduced through tuyer 41 and oxygen may be introduced through circle pipe 28a to simply increase the production of carbon monoxide. Also, carbon dioxide may be introduced through conduit 48 to circle pipe 27a through conduit 33 and control valve 32. One volume of oxygen will produce 4.62 volumes of carbon monoxide when reacting with carbon and carbon dioxide.

The following chart compares some characteristics of some fuels being burned with oxygen and air.

The abbreviations used in this chart are as follows:
Calories per unit volume of flue gas (hereinafter "cpuvfg");
heat intensity compared to base (hereinafter "hicb");
calories per unit volume of oxygen (hereinafter "cpuvo");
volumes of inert gas (hereinafter "voig");
volumes of flue gas (hereinafter "vofg");
with air (hereinafter "wa");
with oxygen (hereinafter "wo");
volumes of carbon dioxide (hereinafter "vocd");

It is to be understood that all combustion proportions expressed in the tables herein are in reference to calories of energy produced per mole of oxygen combusted.

| fuel | Combustion of carbon and air as a base of comparison | cpuvfg | cpuvo | hicb |
|---|---|---|---|---|
| C wa | $C + O_2 ----> CO_2 + 94,400$ cal/4.76[1], 3.76 voig 3.76 vofg | =19,831 | 94,400 | 100% |
| C wo | $2C + O_2 ------> 2CO +$ 53,600/2 vofg | =26,800 | 53,600 | 135% |
| CO wo | $2CO + O_2 ------> 2CO_2 +$ 135,200/2 vofg | =67,600 | 135,200 | 341% |
| C wo | $C + O_2 ------> CO_2 + 94,400$ | =94,400 | 94,400 | 476% |
| $CH_4$ wa | $CH_4 + O_2 -----> CO_2 + 2H_2O +$ 210, cal/10,520 voig | =20,038 | 105,400 | 101% |
| $C_2H_2$ wo | $C_2H_2 + 5O_2 ----> 4CO_2 + 2H_2O$ 624,000/6 vofg | =104,000 | 124,000 | 524% |
| $C_2H_2$ wa | $C_2H_2 + 5O_2 ----> 4CO_2 + 2H_2O$ 624,000/18.8 voig 24.8vofg | =25,161 | 124,000 | 126% |

[1]For an explanation of gas volumes, see below under "Gas volumes in proportion to unit volume of oxygen."

The primary oxidation of carbon with oxygen, in normal operation, may be remote or slight in the high temperature reactor 52. Rather carbon monoxide may be oxidized to carbon dioxide with oxygen in the high temperature reactor 52, in accordance with the equation $2CO+O_2---->2CO_2+135,200$ cal/mole. Then carbon may be oxidized to carbon monoxide, as the carbon dioxide, or a portion of it, is reduced to carbon monoxide in the back reactor vessel 18, in accordance with the equation $C+CO_2----->-40,800$ cal/mole. Thus, heat may be recovered that may otherwise be wasted. A portion of the carbon dioxide or carbon monoxide may be discharged as a vehicle in removing the oxygen from the process.

If it is desirable to generate excesses of carbon monoxide as an export fuel, and expel the spent oxygen as carbon monoxide rather than carbon dioxide, additional free oxygen may be injected through the tuyer 58 or conduits 28, 29 to raise the thermal level in the high temperature reactor 52 and the thermal level of gases conveyed to the back reactor vessel 18. As the gases are circulated, the elevated energy level will be absorbed in generating carbon monoxide from the carbon dioxide as it percolates up through the coke in the back reactor vessel 18. These two reactions may reach equilibrium. The reaction as illustrated by the equation $2CO+O_2->2CO_2+135,200$ cal/mole, may take place in the high temperature reactor 52. The reaction illustrated in the equation $C+CO_2->2CO-40,800$ cal/mole may take place in the back reactor vessel 18. The thermal balance of these two reactions may be at equilibrium as 4.62 volumes of carbon monoxide are produced per unit volume of oxygen are used (2 vol. (135,200 cal/40,800 cal)–2 vol.=4.62 vol of carbon monoxide/unit vol. of Oxygen used). If the total production of carbon dioxide is converted to carbon monoxide, then the excessive temperature of the gas flowing into back reactor vessel 18a from high temperature shaft 53 must remain somewhat elevated. Coke can be gasified with carbon dioxide to carbon monoxide with little extra thermal loss, as the environment may already be heated to the high temperature for regular smelting reduction functions. The process may incur only minimal amounts of extra heat loss for the further generation of the additional carbon monoxide.

A discussion of the removal of phosphorous will now follow. Phosphorous may exist in a carbonaceous reduced metallic bath as a dissolved chemical iron bond. To remove the phosphorous from solution, the phosphorous may be oxidized, which may be readily accomplished because of the presence of iron oxide in the slightly oxidized reduced metal bath and since the phosphorous pentoxide floats to the top of the metal bath and becomes part of the slag layer. The slag bath may be maintained predominately acidic during the initial reduction phase. In the slag layer the phosphorous material may be reduced to elemental phosphorous by a layer of coke injected on the top of the slag layer. This may occur at temperatures well above 2800 degrees F. Elemental phosphorous may be a vapor above 516 degrees F., and may flow up through the high temperature shaft 53 out through conduit 51 with the rising gas to the back reactor vessel 18b through conduit 51b. The phosphorous may remain as elemental phosphorous due to the high temperature and carbonaceous atmosphere maintained in the back reactor vessel 18b. Then the phosphorous may pass upwardly through the porous carbonaceous material of coke masses 7 to the effluent conduit 80 and on to the boiler 84 where it may be condensed to the liquid state and removed as a by-product.

It will be appreciated that the driving chemical action in the metal and slag baths may be exactly opposite to the condition in other customary refining methods for the removal of phosphorous. In the prior art refining methods, the metal bath may be highly carbonaceous and the slag bath oxidizing. The carbon in the metal tends to reduce the phosphorous pentoxide which can then react and bond once again to the iron in the metal bath. To counter this action, sizeable amounts of ferrous oxide must be maintained in the slag bath to retain the phosphorous pentoxide in the slag bath, and also to oxidize the ferrous phosphate in the metal bath, thus realizing extensive quantities of iron constituents remaining in the slag bath that are lost with the removal of this adverse impurity. In the process of the present disclosure, on the contrary, phosphorous may be oxidized as phosphorous pentoxide by the ferrous oxides (that are introduced into the process to be reduced) and driven out of the metal bath into the slag bath by a slightly oxidizing metal bath. Here the phosphorous pentoxide may be reduced and removed from the carbonaceous slag layer and emitted as elemental phosphorous.

The intensity of the heat of combustion may be determined by the amount of heat or the number of calories released per unit volume of flue gas produced. Although carbon monoxide may be a relatively low calorific fuel gas per unit volume of fuel gas, it burns with a relatively high intensity. The low volume of flue gas produced with the combustion of carbon monoxide equals high calorific energy per unit volume of flue gas generated. This can be illustrated by the following comparison with other fuels with air and their oxygen consumption, and the volume of their flue gas production as they burn, discounting the thermal expansion:

Gas Volumes in Proportion to Unit Volume of Oxygen:
Air is 21% oxygen and 79% inactive gas. 79% inactive gas/21% oxygen=3.76 vol. inactive gas per unit volume of oxygen, and as such the total volume of air is 4.76 total volumes of air per unit of volume of oxygen. The calorific combustion ratios per unit volume of flue gas production, using air as the oxidant and coke as the base fuel for comparison, can be described by the equation $C+O_2$, 4.76 vol. of air->$CO_2$+94,400 cal/4.76 vol. of flue gas or 19,831 cal/unit vol of flue gas production as the comparison base.

The abbreviations used in the chart below are as follows:
calories per unit volume of flue gas, cpuvfg;
heat intensity compared to base, hicb;
calories per unit volume of oxygen, cpuvo;
volumes of inert gas, voig;
volumes of flue gas, vofg;
with air, wa;
with oxygen, wo;
volumes of carbon dioxide in the fuel, vocd;
volume, v.

| Fuel | | cpuvfg | cpuvo | hicb |
|---|---|---|---|---|
| CO 100% wa | $2CO + O_2$ ----> $2CO_2$ + 135,200 cal/5.76vofg, 3.76voig, 5.76vofg | =23,472 | 135,200 | 118% |
| CO 95% wa | $2CO + O_2$ ----> $2CO_2$ + 135,200 cal/5.86vofg, 0.1vocd, 3.76voig 5.86vofg | =23,071 | 135,200 | 116% |
| CO 90% wa | $2CO + O_2$ ----> $2CO_2$ + 135,200 cal/5.98vofg, 0.22vocd, 3.76voig, 5.98vofg | =22,608 | 135,200 | 114% |
| CO 85% wa | $2CO + O_2$ ----> $2CO_2$ + 135,200 cal/6.12vofg, 0.353vocd, 3.76voig, 6.12vofg | =22,091 | 135,200 | 111% |
| H2 wo | $2H_2 + O_2$ ----> $2H_2O$ + 117,400 cal/2vofg | =58,700 | 117,400 | 296% |
| H2 wa | $2H_2 + O_2$ ----> $2H_2O$ + 117,400 cal/5.76vofg, 3.76voig | =20,381 | 117,400 | 103% |
| C wo | $2C + O_2$ ----> $2CO$ + 53,600 cal/2vofg | =26,800 | 53,600 Corex | 135% |
| C wa | $2C + O_2$ ----> $2CO$ + 53,600 cal/5.76vofg, 3.76 voig | =9,305 | 53,600 Blast furnace | 46% |
| CO wo | $2CO + O_2$ ----> $2CO_2$ + 135,200 cal/2vofg | =67,600 | 135,200 TSPS | 341% |
| C wo | $C + O_2$ ----> $CO_2$ + 94,000 | =94,400 | 94,400 | 476% |
| CH4 wa | $CH_4 + 2O_2$ ----> $CO_2 + 2H_2O$ + 210,000 cal/10.52 vofg | =20,038 | 105,400 | 101% |
| C2H2 wo | $C_2H_2 + 5O_2$ ----> $4CO_2 + 2H_2O$ + 624,000 + 624,000/6 vofg | =104,000 =104,000 | 124,000 124,000 | 524% 524% |
| wa | 624,000/24.8vofg 18.8 voig | =25,161 | 124,000 | 126% |

The intensity of the heat of combustion may be determined by the amount of heat or the number of calories released per unit volume of flue gas produced. As illustrated in the above comparison with carbon and air as a base, natural gas has become a prevalent fuel. The following will be a like comparison of the combustion of methane with air as a comparison base with other fuels. Air is 21% oxygen and 79% inactive gas. 79% inactive gas/21% oxygen=3.76 volume units of inactive gas per unit volume of oxygen, the total volume of air being 4.76 volume units per unit volume of oxygen. Calorific combustion ratios per unit volume of flue gas production, using air as the oxidant and methane as the base fuel for comparison.

$CH_4+2O_2$, 9.52 vol. of air->$CO_2+2H_2O$+210,700 cal/10.52 vol. of flue gas or 20.038 cal/unit vol of flue gas production as the base.

The abbreviations used in the chart below are as follows:
calories per unit volume of flue gas, cpuvfg;
heat intensity compared to base, hicb;

calories per unit volume of oxygen, cpuvo;
volumes of inert gas, voig;
volumes of flue gas, vofg;
with air, wa;
with oxygen, wo;
volumes of carbon dioxide in the fuel, vocd;
volume, v.

| Fuel | | cpuvfg | cpuvo | hicb |
|---|---|---|---|---|
| CO 100% wa | $2CO + O_2 \longrightarrow 2CO_2 + 135{,}200$ cal/5.76v, 3.76voig, 5.76vofg | =23,472 | 135,200 | 117% |
| CO 95% wa | $2CO + O_2 \longrightarrow 2CO_2 + 135{,}200$ cal/5.86v, 0.11vocd, 3.76voig 5.86vofg | =23,071 | 135,200 | 115% |
| CO 90% wa | $2CO + O_2 \longrightarrow 2CO_2 + 135{,}200$ cal/5.98v, 0.22vocd, 3.76voig, 5.98vofg | =22,608 | 135,200 | 113% |
| CO 85% wa | $2CO + O_2 \longrightarrow 2CO_2 + 135{,}200$ cal/6.12v, 0.353vocd, 3.76voig, 6.12vofg | =20,091 | 135,200 | 110% |
| H2 wo | $2H_2 + O_2 \longrightarrow 2H_2O + 117{,}400$ cal/2v, 2vofg, 3.76voig, 5.76vofg | =58,700 | 117,400 | 293% |
| wa | + 117,400 cal/5.76vofg, 3.76voig | =20,381 | 117,400 | 102% |
| C wo | $2C + O_2 \longrightarrow 2CO + 53{,}600$ cal/2v, 2vofg, | =26,800 | 53,600 Corex | 134% |
| wa | + 53,600 cal/5.76v, 3.76 voig, 5.76vofg | =9,305 | 53,600 Blast furnace | 45% |
| CO wo | $2CO + O_2 \longrightarrow 2CO_2 + 135{,}200$ cal/2v, 2 voig | =67,600 | 135,200 TSPS | 337% |
| C wo | $C + O_2 \longrightarrow CO_2 + 94{,}000 +$ 94,000/1v | =94,400 | 94,400 | 471% |
| wa | 94,000/4.76vofg, 3.76 voig | =19,831 | 124,000 | 99% |
| C2H2 wo | $C_2H_2 + 5O_2 \longrightarrow 4CO_2 + 2H_2O +$ 624,000/6vofg | =104,000 | 124,000 | 524% |
| wa | 624,000/24.8 vofg, 18.8voig | =25,161 | 124,000 | 126% |

Three different oxidants reactions with carbon are listed below along with their caloric equivalents.

$C+O_2 \longrightarrow CO_2+94{,}400$ cal;
$C+H_2O \longrightarrow H_2+CO-31{,}400$ cal/mole;
$C+CO_2 \longrightarrow 2CO-40{,}800$ cal/mole.

Reactions illustrating different routes and different oxidants in the gasification of carbon along with the caloric balances and their volumes of gas generated per unit volume of oxygen consumed are listed below:

$2CO+O_2 \longrightarrow 2CO_2+135{,}200$ cal/mole of $O_2$;
$2(CO_2+C) \longrightarrow 2CO-40{,}800$ cal/mole;
2 vol (135,200 cal/mole of O2/40,800 cal/mole)–2 vol=4.627 vol. of CO/vol. $O_2$;
$2C+O_2 \longrightarrow 2CO+53{,}600$ cal/mole of $O_2$;
$C+CO_2 \longrightarrow 2CO-40{,}800$ cal/mole;
2 vol+2 vol(53,600 cal/mole of O2/40,800 cal/mole)= 4.627 vol. of CO/vol. of $O_2$;
$C+O_2 \longrightarrow CO_2+94{,}400$ cal/mole of $O_2$;
$C+CO_2 \longrightarrow 2CO-40{,}800$ cal;
2 vol(94,400 cal/40,800 cal)=4.627 vol. of CO/vol. of $O_2$;
$2C+O_2 \longrightarrow 2CO+53{,}600$ cal/mole of $O_2$;
$C+H_2O \longrightarrow H_2+CO-31{,}400$ cal/mole;
2 vol.+(53,600 cal/31,400 cal)CO=3.70 vol. CO/vol of $O_2$;
1 vol. (53,600 cal/31,400 cal) $H_2$=1.70 vol. $H_2$/vol. of $O_2$;
3.70 vol of CO+1.70 vol $H_2$/vol. $O_2$=total 5.40 vol. of gases produced/vol. of $O_2$.

The combustion cycle utilized in this process can also be employed in the reduction and smelting of other metals. Also it may be employed in high temperature furnaces used in many types of high temperature heating applications.

It will be understood that one embodiment of the present disclosure may include a process 100 in which carbon monoxide is circulated through a cycle. The carbon monoxide may pass through a gas generating and heating device 18c, a conduit 46 a rotary kiln 6, a by-products area 12 completing the coking process. Also, super heated carbon monoxide may be diverted from back reactor 18a through conduit 40 valve 42 to rotary kiln 6 which may likewise accomplish the coking process. It will be understood that other arrangements of the cycle may be used within the scope of the present disclosure, and that material may be removed and added throughout the cycle.

It will also be appreciated that one embodiment of the present disclosure may be configured such that the process 100 may be formed as a metal production process. The process 100 may include perpetuating a carbon monoxide transformation and regeneration cycle. The carbon monoxide transformation and regeneration cycle may include a first region, such as the high temperature reactor 52, in which carbon monoxide is transformed into a second gas residing in a non-carbon monoxide state, such as carbon dioxide. The process 100 may also include a second region, such as the back reactor vessels 18a, in which carbon monoxide is regenerated from the second gas and conveyed into the first region. The process 100 may also include placing metallic material into the first region to allow heat produced from the transformation of carbon monoxide to heat the metallic material as part of the metal production process. More specifically, the process 100 may include the placement of carbon monoxide in the high temperature reactor 52 wherein the carbon monoxide is transformed into carbon dioxide. The carbon dioxide may travel through the reactor effluent conduit 51 to the back reactor vessels 18a. The carbon dioxide may be used to regenerate carbon monoxide in the back reactor vessel 18a, and the carbon monoxide may travel through conduit 50a to the carbon monoxide conduit 70 and back to the high temperature reactor 52 to complete the high temperature carbon monoxide transformation and regeneration cycle in back reactor 18a. Carbon dioxide may also be used to generate carbon monoxide in low temperature back reactor 18b. This gas may be low concentration carbon monoxide, the concentration and temperature may be increased to some degree by allowing carbon dioxide from conduit 50a to pass through conduit 23 via control valve 3 into conduit 50b.

It will be understood that the specific configuration of structures such as conduits, valves, blowers and reactors, for example, described above and illustrated in the drawings, is for illustrative purposes only, and that other arrangements of structures may be used within the scope of the present disclosure. For example, conduits 13, 17, 43, 47, 69, 73, 93, and 97 are disclosed in addition to the conduits discussed above. However, it will be appreciated that conduits may be arranged in various other configurations within the scope of the present disclosure. Similarly, valves 8, 49, 59, 63, 65, 75, 78, 79, 83, 92, and 98 as well as blowers 15, 38, 67, and 81 are disclosed in addition to the valves and blowers previously discussed. It will be understood that various different arrangements and quantities of valves and blowers may be used within the scope of the present disclosure.

Figure 2:
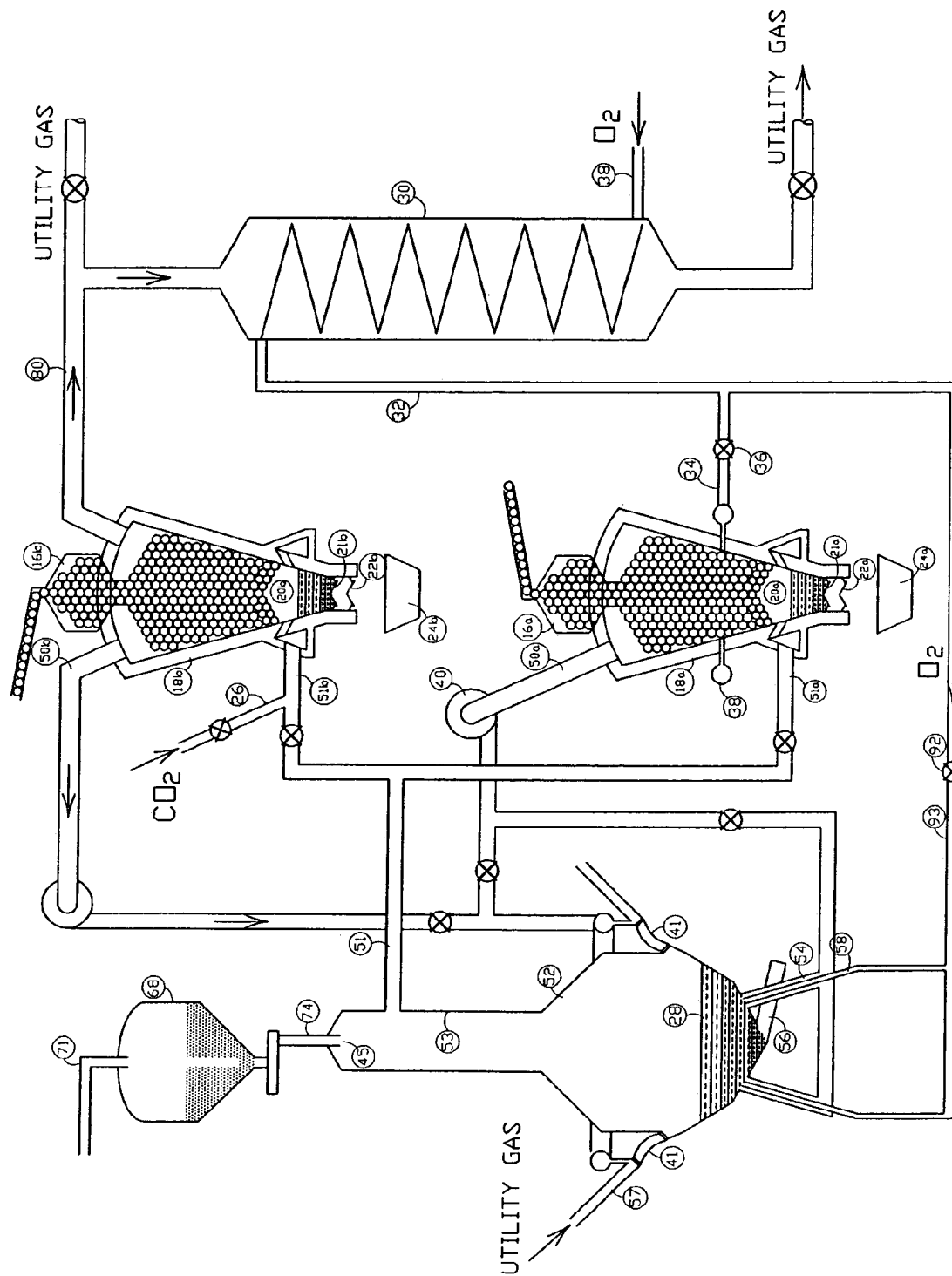
FIG. 2 is a schematic view of an alternative embodiment active metals production process, useful for producing aluminum, silicon or other suitable active metals, or metals that may form metal carbides if reduced in the presence of carbon. These carbide forming metals may otherwise be reduced in a carbon free environment by exposure to carbon monoxide, whereby they are reduced to the elemental state.

Reference will now to made to FIG. 2 to describe an alternative embodiment of the present disclosure. As previously discussed, the presently disclosed embodiments illustrated herein are merely exemplary of the possible embodiments of the invention, including that illustrated in FIG. 2.

It will be appreciated that the alternative embodiment illustrated in FIG. 2 contains many of the same features as represented in FIG. 1, and primarily the new or different features will be explained to most succinctly explain the additional advantages which come with the embodiment of the disclosure illustrated in FIG. 2.

In the embodiment of FIG. 2, oxygen may be added to the process 200 through conduit 138. The Oxygen may be preheated in a heat exchanger 130 to temperatures approaching approximately 1100 degrees F. The preheated oxygen may then be transported to a back reactor vessel 18a through conduits 132 and 134. The flow of oxygen may be controlled by a valve 136, for example. The gas percolating through the coke in the back reactor vessel 18a from conduit 51a may be super heated above 1800 degrees F. by adding the preheated oxygen. The addition of oxygen to the back reactor vessel 18a may generate more carbon monoxide and heat which may elevate the energy of the carbon monoxide to a higher temperature. This carbon monoxide may then be transported to the crucible 52 to thereby increase the temperatures achieved in the crucible 52 as compared to the previous process.

Similar to the process discussed above with respect to FIG. 1, carbon monoxide gas along with oxygen may be injected into the crucible 52 through the coaxial tuyers 58. The carbon monoxide gas may range in temperatures from approximately 1100 to 2000 degrees F. Oxygen may be preheated to temperatures approaching approximately 1100 degrees and may be injected into the crucible 52 through the center of the tuyer 58a. There may be varying amounts of excess carbon monoxide for the oxygen to oxidize in the crucible 52. The combustion of the carbon monoxide with oxygen may elevate the temperatures of all the reactive material in the crucible, conditioning the reactive material to an excited state such that it may react. Also, the active elements of the stable materials may be reduced and the carbon monoxide may be oxidized and removed with quantities of sensible heat. The flue gases exiting the material in the crucible 52 may be at a very high temperature and have varying quantities of carbon dioxide. The controlled flow of these gases may go to the back reactor vessels 18a, 18b. The back reactor vessels 18a, 18b may convert the carbon dioxide, carbon and sensible heat to carbon monoxide, absorbing heat and lowering the temperature of the gases in the back reactor vessels 18a, 18b, in a manner as discussed above. The temperature of the gases may be lowered between 1100 and 1800 degrees F. depending on the concentration of the carbon dioxide and the equilibrium of carbon dioxide and carbon monoxide at various temperatures, for example as the gases percolate through the coke in the back reactor vessel 18a. If the quantities of heat energy are sufficient, all the carbon monoxide may be converted to carbon monoxide when the sensible energy remains above 1800 degrees F. in back reactor vessel 18a. If a greater portion of the sensible energy above 1100 degrees is to be utilized in the generation of carbon monoxide in back reactor vessel 18b, additional carbon dioxide may be supplied through conduit 85, tilting the equilibrium of the reaction to the production of carbon monoxide and utilizing energy. Excess gas produced in this process may be removed through the conduit 80. The gas may then pass through the heat exchanger 130 for preheating the oxygen used in the process, or the gas may be passed through a catalytic converter for producing hydrogen. The excess gas may also be removed from the process for use as a utility gas, for example, or any other desired purpose known in the art.

The combustion gases blowing up through the molten material 28 in the crucible 52 may allow super heating of the bath as high as the limitations on the refractory liner will allow. As the gases exit the molten bath, they may be surrounded by and contained in a blended layer of cooling gas derived from the back reactor vessels 18a, 18b, and injected through tuyers 41. The gas injected through tuyers 41 may be used to shield the refractory lining of the crucible 52 above the molten material 28 from the intense heat of the combustion in the crucible 52. Granulated or crushed processing material may be fed from the storage vessel 68 to free fall countercurrent to the ascending flue gas in the crucible 52. The processing materials may thus be preheated prior to entering the molten bath 28. Once the product in the crucible 52 is reduced, it may be removed through the port 56, as discussed above.

An advantage of the process disclosed in FIG. 2 is that an environment is created such that endothermic chemical reactions and reactions forming carbides can take place absent from different materials that may release carbon and otherwise may react to form carbides of the metals rather than the metals, in the presence of carbon. This may allow the utilization of materials, such as aluminum, silicon, and alkali, for example, in a more economical manner than prior art methods.

The process depicted in FIG. 2 may be used to take advantage of a combination of two different phenomena. First, a highly intensive combustion may be utilized to enhance the conditions for which endothermic reactions may occur. The temperatures generated may be so hot as to push the upper limits of what some of the best refractory linings in crucibles may withstand without deteriorating. The second feature of the process of FIG. 2 may include controlling the temperature in the crucible at a level slightly below the limit of what the refractory lining can withstand by maintaining a proper temperature of a flue gas injected into the crucible. The higher temperatures created from the combustion of carbon monoxide and oxygen allow interatomic bonding of various different compounds which would not occur at lower temperatures. The higher temperatures may allow the absorbing of energy and excitation of electrons to higher orbitals which allows for additional types of bonding to occur. By increasing the energy level, the equilibrium of the reactions in the crucible may be changed, tilting toward materials being reduced or favoring the products that absorb energy rather than the reactants being oxidized. The higher the energy level, the greater the tilt such that a greater amount of material may be reduced. Since the oxidized product ($CO_2$) is removed from the crucible, the high intensity heat may be sustained and the flow of super heated carbon monoxide may be maintained always favoring the equilibrium for the reduction of the material. This method may effectively produce materials that may be much more active chemically than the carbon monoxide or other reactants being oxidized or replaced. Accordingly, reducing reactions that are endothermic and economically efficient may be created. This process may be designed for the purpose of attaining high intense energy levels, producing superheated carbon monoxide gas for both combustion and reduction means, and recovering the high energy levels not utilized in the process. The energy may be reclaimed and recycled for use in the same process, or the excesses may be exported for other energy purposes.

In accordance with the features and combinations described above, a useful method of forming steel includes the steps of:

(a) combusting carbon monoxide and oxygen in a reactor with ore, the combustion forming a carbon dioxide gas;

(b) placing coke in a back reactor vessel and reacting the carbon dioxide with the coke to form carbon monoxide;

(c) using the carbon monoxide formed in the back reactor to combust with oxygen in the reactor.

Those having ordinary skill in the relevant art will appreciate the advantages provide by the features of the present disclosure. For example, it is a feature of the present disclosure to provide a process for producing steel that allows various amounts of scrap and ore to be used in the production of different heats of steel depending upon the scrap market and the quality and grade of steel required. Thus, the process may provide the ability to use the least expensive raw materials for the various qualities of steel required.

Another feature of the present disclosure is to provide a process which is environmentally friendly that has the option of using bituminous coal as an energy source for both reduction of the ore and the production of utility fuel. Bituminous coal is the most abundant source of fossil fuels and also maintains a very stable market price, making it a very desirable energy source.

A further feature of the present disclosure is to implement a means of utilizing secondary combustion of carbon in the fusion and reduction of the metallic in the molten bath of steel. Accordingly, the primary combustion of carbon may liberate approximately 53,600 cal/mole, and the secondary combustion may release an additional 135,200 ca/mole.

It is an additional feature of the present disclosure to allow both carbon monoxide and fine coke breeze to be deployed as reducing agents and back reacting reagents teamed together for the primary reduction of the iron ore. Carbon monoxide, used apart as a reducing reagent, may continue generating higher temperatures with the raw materials until they attain sufficient temperatures causing a phase change in the raw iron ore dross, becoming sticky and with loss of fluidity ceasing to flow resulting in the process coming to a stand still. By admixing fine coke with the fine ore the back reaction of the coke with the carbon dioxide may maintain a temperature somewhat above 1100 degrees Fahrenheit which is well below the sticky stage. By teaming them together as the reactions proceeds simultaneously, the energy levels of the two reaction moderate each others' energy level as the ore continues smoothly in a fluidized granular state. Also toxic hydrocarbons, dioxin, methane and hydrogen gases may be injected through conduit 87, to generally cool the process. These gases may also be injected through conduit 11 into hot spots of the reduction process, which may also cool the raw ore, so that it may maintain a fluidized solid state suspended in flowing gases.

It is an additional feature of the present disclosure to develop a fuel that can be heated to high temperature without decomposing into hydrogen and carbon residue and also burning with a high intensity of heat.

It is another feature of the present disclosure to achieve high combustion and bath temperatures for rapid fusion reduction and material melt down.

It is a further feature of the present disclosure to employ a means both physical and chemical for recovering the sensible heat carried away with the off-gas, which is generated by the high temperature fusion and elevated temperature operation required to process the crude liquid steel.

It is an additional feature of the present disclosure to provide a process that employs a means to generate a fuel that burns with a higher intensity, utilizing the sensible heat along with the chemical energy contained in the off-gases, than what could be produced from the direct combustion.

It is an additional feature to provide a process that eliminates the need for producing coke in the environmental polluting and thermal inefficient coke ovens.

Another feature of the present disclosure is to allow use of a means of effectively removing sulphur from the fuel and ore used in traditional processes.

It is also a feature of the present disclosure to allow use of a means of effectively recovering phosphorous from the process, as phosphorous is a valued product when removed and recovered properly.

A further feature of the present disclosure is to provide a process that may recover the volatile materials from the coal during the carbonizing as there are many valued products in these volatile materials which should not be incinerated.

It is an additional feature of the present disclosure to provide a process that may utilize fine concentrate ore particulate as the primary source of raw material, as this is the least expensive raw iron resource to procure and effectively reduce.

Another feature of the present disclosure is to provide a process that may require low capital intensity with a minimum of unit operations.

It is a further feature of the present disclosure to provide a process that may avoid excessive energy usage and loss in the carbonizing and destructive distillation of coal for the process.

Additionally, a feature of the present disclosure may be to eliminate the inactive gases in the air from dissolving or mixing with the reactants of the process. The present disclosure may thereby enhance the rate of the reactions and eliminate a substantial lose of sensible heat that is removed with the inert gases in the air, contaminating the product.

It is a further feature of the present disclosure to provide a process that may have the ability of producing crude liquid steel containing low levels of impurities particularly oxygen, silicon, manganese, phosphorous, sulphur, nitrogen, hydrogen and carbon.

Another feature of the present disclosure is to provide a process that may readily achieve high levels of metallic temperatures for low cost carbon deoxidizing.

It is an additional feature of the present disclosure to provide a process that may readily achieve a high metallic temperatures prior to taping and alloying.

A further feature of the present disclosure is to provide a process that may have the ability to gasify coke, using carbon dioxide as the cooling oxidant rather than steam, thereby conserving the water resources and utilizing the carbon dioxide rather than discharging it into the atmosphere where it serves no additional useful purpose. The present disclosure may thereby reduce the environmental greenhouse effect as compared to traditional steel production processes.

It is another feature of the present disclosure to provide a process that may achieve low oxygen consumption per unit weight of crude liquid steel production.

Another feature of the present disclosure is to provide a process that may achieve low production of carbon dioxide per unit weight of steel produced.

It is an additional feature of the present disclosure to provide a process that may require small quantities of water per unit weight of steel produced.

Another feature of the present disclosure is to provide a process that may employ solutions of efficiency, automation and reliability, and require low consumption of electrical energy. Moreover, it is a feature of the present disclosure to provide a process that may produce low hydrogen steel which has superior mechanical characteristics.

In the foregoing Detailed Description, various features of the present disclosure are grouped together in a single embodiment for the purpose of streamlining the disclosure.

This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of forming steel comprising the steps of:
(a) combusting carbon monoxide and oxygen in a reactor with ore, the combustion forming a carbon dioxide gas;
(b) placing a carbon material in a vessel and reacting the carbon dioxide with the carbon material to form carbon monoxide;
(c) using the carbon monoxide formed in the vessel to combust with oxygen in the reactor;
wherein step (b) comprises providing said carbon material from a coal source;
further comprising transferring said coal to a rotary kiln;
further comprising generating and heating carbon monoxide and passing said heated carbon monoxide through said coal in said rotary kiln to form coke masses;
further comprising withdrawing volatile gases from said rotary kiln for use outside of said rotary kiln.

2. The method of claim 1, wherein said coal is crushed to particles ranging in size from 0–25 millimeters.

3. The method of claim 1, further comprising removing said coke masses from said rotary kiln to form said carbon material for placing in said vessel.

4. The method of claim 3, further comprising diminishing the size of said coke masses by the reaction with the carbon dioxide to form coke remnants.

5. The method of claim 4, further comprising removing said coke remnants from the vessel.

6. The method of claim 1, further comprising the step of commuting said ore before placing said ore in said reactor.

7. The method of claim 1, further comprising partially reducing said ore in a reduction vessel before placing said ore in said reactor.

8. The method of claim 1, further comprising forming an oxidizing metallic bath in said reactor.

9. The method of claim 1, further comprising placing scrap steel in said reactor.

10. The method of claim 1, further comprising removing elemental phosphorous from the reactor as a vapor.

11. The method of claim 10, further comprising condensing the vapor to remove the phosphorous.

12. The method of claim 1, further comprising placing coke in said reactor.

13. The method of claim 1, further comprising placing fluxing materials in said reactor.

14. The method of claim 1, further comprising forming a molten bath in said reactor.

15. The method of claim 14, further comprising skimming slag from said molten bath.

16. The method of claim 14, further comprising forming an acidic slag layer on said molten bath.

17. The method of claim 16, further comprising injecting a layer of coke on the slag layer for reducing phosphorous pentoxide in the slag to elemental phosphorous.

18. The method of claim 17, further comprising removing the elemental phosphorous from the reactor as a vapor.

19. The method of claim 18, further comprising condensing the elemental phosphorous from the vapor.

20. A method of forming steel comprising the steps of:
(a) passing heated carbon monoxide through coal to form coke;
(b) reacting carbon dioxide with the coke to form a carbon monoxide fuel; and
(c) combusting the carbon monoxide fuel to heat ore for forming steel;
wherein step (c) further comprises combusting the carbon monoxide fuel with oxygen in a reactor; and
further comprising forming a molten bath in said reactor.

21. The method of claim 20, wherein said coal is crushed to particles ranging in size from 0–25 millimeters.

22. The method of claim 20, wherein step (a) comprises transferring said coal through a rotary kiln.

23. The method of claim 20, further comprising forming said coke into coke masses.

24. The method of claim 20, wherein step (b) further comprising placing said coke in a vessel.

25. The method of claim 20, further comprising the step of commuting said ore and placing said ore in said reactor.

26. The method of claim 25, further comprising partially reducing said ore in a reduction vessel before placing said ore in said reactor.

27. The method of claim 20, further comprising removing elemental phosphorous from the reactor as a vapor.

28. The method of claim 27, further comprising condensing the vapor to remove the phosphorous.

29. The method of claim 20, further comprising placing coke in said reactor.

30. The method of claim 20, further comprising placing fluxing materials in said reactor.

31. The method of claim 20, further comprising skimming slag from said molten bath.

32. The method of claim 20, further comprising forming an acidic slag layer on said molten bath.

33. The method of claim 32, further comprising injecting a layer of coke on the slag layer for reducing phosphorous pentoxide in the slag to elemental phosphorous.

34. The method of claim 33, further comprising removing the elemental phosphorous from the reactor as a vapor.

35. The method of claim 34, further comprising condensing the elemental phosphorous from the vapor.

36. The method of claim 20, wherein step (c) further comprises injecting said carbon monoxide fuel into a reactor.

37. A method of forming steel comprising the steps of:
(a) passing heated carbon monoxide through coal to form coke;
(b) reacting carbon dioxide with the coke to form a carbon monoxide fuel; and
(c) combusting the carbon monoxide fuel to heat ore for forming steel;

wherein step (c) further comprises combusting the carbon monoxide fuel with oxygen in a reactor; and further comprising forming said carbon dioxide in said reactor, and conveying said carbon dioxide to a vessel separate from said reactor, said vessel containing said coke such that said carbon monoxide fuel is formed in said vessel, and conveying said carbon monoxide fuel formed in said vessel to said reactor for combusting with oxygen to melt said ore in said reactor.

38. A method of forming steel comprising the steps of:
(a) passing heated carbon monoxide through coal to form coke;
(b) reacting carbon dioxide with the coke to form a carbon monoxide fuel; and
(c) combusting the carbon monoxide fuel to heat ore for forming steel;
wherein step (a) comprises transferring said coal through a rotary kiln; and
further comprising withdrawing volatile gases from said rotary kiln for use outside of said rotary kiln.

39. A method of forming steel comprising the steps of:
(a) passing heated carbon monoxide through coal to form coke;
(b) reacting carbon dioxide with the coke to form a carbon monoxide fuel; and
(c) combusting the carbon monoxide fuel to heat ore for forming steel;
wherein step (c) further comprises combusting the carbon monoxide fuel with oxygen in a reactor; and
further comprising forming an oxidizing metallic bath in said reactor.

40. The method of claim 39, further comprising placing scrap steel in said reactor.

41. A method of forming steel comprising the steps of:
(a) placing ore in a reactor and combusting a carbon monoxide fuel and oxygen in the reactor with the ore to heat and melt the ore and to produce carbon dioxide;
(b) reacting the carbon dioxide produced in the reactor with coke in a vessel separate from the reactor to form the carbon monoxide fuel; and
(c) conveying the carbon monoxide fuel produced in part (b) to the reactor for combusting the carbon monoxide fuel in the reactor to heat and melt the ore for forming steel.

42. The method of claim 41, further comprising the step of commuting said ore before placing said ore in said reactor.

43. The method of claim 41, further comprising partially reducing said ore in a reduction vessel before placing said ore in said reactor.

44. The method of claim 41, further comprising forming an oxidizing metallic bath in said reactor.

45. The method of claim 41, further comprising placing scrap steel in said reactor.

46. The method of claim 41, further comprising heating carbon monoxide and passing said heated carbon monoxide through coal in a rotary kiln to form said coke.

47. The method of claim 46, further comprising withdrawing volatile gases from said rotary kiln for use outside of said rotary kiln.

48. The method of claim 41, further comprising removing elemental phosphorous from the reactor as a vapor.

49. The method of claim 48, further comprising condensing the vapor to remove the phosphorous.

50. The method of claim 41, further comprising placing coke in said reactor.

51. The method of claim 41, further comprising placing fluxing materials in said reactor.

52. The method of claim 41, further comprising forming a molten bath in said reactor.

53. The method of claim 52, further comprising skimming slag from said molten bath.

54. The method of claim 52, further comprising forming an acidic slag layer on said molten bath.

55. The method of claim 54, further comprising injecting a layer of coke on the slag layer for reducing phosphorous pentoxide in the slag to elemental phosphorous.

56. The method of claim 55, further comprising removing the elemental phosphorous from the reactor as a vapor.

57. The method of claim 56, further comprising condensing the elemental phosphorous from the vapor.

58. A metal production process comprising:
(a) perpetuating a carbon monoxide transformation and regeneration cycle including a first region in which carbon monoxide is transformed into a second gas residing in a non-carbon monoxide state, and a second region in which carbon monoxide is regenerated from said second gas and conveyed into said first region;
(b) placing metallic material into the first region to allow heat produced from the transformation of carbon monoxide to heat and melt said metallic material as part of said metal production process.

59. The process of claim 58, wherein said metallic material is iron ore.

60. The process of claim 58, wherein said metal production process is a steel production process.

61. The process of claim 58, wherein said second gas is carbon dioxide.

62. The process of claim 58, further comprising combusting said carbon monoxide with oxygen in said first region.

63. The process of claim 58, wherein said second gas reacts with coke in said second region to regenerate carbon monoxide.

64. The process of claim 63, further comprising producing said coke by reacting coal with carbon monoxide.

65. The process of claim 58, further comprising forming an oxidizing metallic bath in said first region.

66. The process of claim 58, further comprising placing scrap steel in said first region.

67. The process of claim 58, further comprising removing elemental phosphorous from the first region as a vapor.

68. The method of claim 41, further comprising:
(d) generating and heating carbon monoxide and passing said heated carbon monoxide through coal in a rotary kiln to form said coke;
(e) withdrawing volatile gases from said rotary kiln as a product for use outside said rotary kiln;
(f) conveying said coke from said rotary kiln to said vessel for use in reacting with the carbon dioxide for forming said carbon monoxide fuel; and
(g) conveying a portion of said carbon monoxide fuel formed in said vessel to a reduction vessel for partially reducing said ore prior to placing said ore in said reactor.

69. A method of forming steel comprising the steps of:
(a) combusting carbon monoxide and oxygen in a reactor with ore, the combustion forming a carbon dioxide gas;
(b) placing a carbon material in a vessel separate from the reactor and reacting the carbon dioxide formed in the reactor with the carbon material to form carbon monoxide;

(c) using the carbon monoxide formed in the vessel to combust with oxygen in the reactor to heat and melt the ore in the reactor;

wherein step (b) comprises providing said carbon material from a coal source;

wherein said coal is crushed to particles ranging in size from 0–25 millimeters;

further comprising transferring said coal to a rotary kiln;

further comprising generating and heating carbon monoxide and passing said heated carbon monoxide through said coal in said rotary kiln to form coke masses;

further comprising withdrawing volatile gases from said rotary kiln as a product for use outside said rotary kiln;

further comprising removing said coke masses from said rotary kiln to form said carbon material for placing in said vessel;

further comprising diminishing the size of said coke masses by the reaction with the carbon dioxide to form coke remnants;

further comprising removing said coke remnants from the vessel;

further comprising the step of commuting said ore before placing said ore in said reactor;

further comprising partially reducing said ore in a reduction vessel before placing said ore in said reactor;

further comprising forming an oxidizing metallic bath in said reactor;

further comprising placing scrap steel in said reactor;

further comprising placing coke in said reactor;

further comprising placing fluxing materials in said reactor;

further comprising forming a molten bath in said reactor;

further comprising skimming slag from said molten bath;

further comprising forming an acidic slag layer on said molten bath;

further comprising conveying a portion of said carbon monoxide formed in said vessel to said reduction vessel for partially reducing said ore.

* * * * *